United States Patent
Hirasawa et al.

[11] Patent Number: 6,028,981
[45] Date of Patent: Feb. 22, 2000

[54] IMAGE RECORDING APPARATUS

[75] Inventors: Masahide Hirasawa, Kanagawa-ken; Toshinobu Yamaguchi, Tokyo; Hiroto Ohkawara, Ibaraki-ken, all of Japan

[73] Assignee: Canon Kabushiki Kaisha, Tokyo, Japan

[21] Appl. No.: 08/300,701

[22] Filed: Sep. 2, 1994

Related U.S. Application Data

[63] Continuation of application No. 07/936,121, Aug. 27, 1992, abandoned.

[30] Foreign Application Priority Data

| Sep. 2, 1991 | [JP] | Japan | 3-221708 |
| Oct. 8, 1991 | [JP] | Japan | 3-260401 |
| Oct. 18, 1991 | [JP] | Japan | 3-270927 |
| Oct. 21, 1991 | [JP] | Japan | 3-272625 |
| Oct. 23, 1991 | [JP] | Japan | 3-275517 |

[51] Int. Cl.$^7$ .................................................. H04N 5/225
[52] U.S. Cl. .......................................... 386/117; 348/207
[58] Field of Search .................................. 358/906, 335, 358/310, 342; 360/33.1, 35.1; 348/207; 386/117–121; 4/38; H04N 5/76, 5/78, 5/781, 5/782, 5/783, 9/79, 5/92, 5/225

[56] References Cited

U.S. PATENT DOCUMENTS

| 4,692,815 | 9/1987 | Kawahara et al. | 358/906 |
| 4,827,348 | 5/1989 | Ernest et al. | 358/909 |
| 4,972,266 | 11/1990 | Tani | 358/909 |
| 5,053,871 | 10/1991 | Ogawa et al. | 358/909 |
| 5,065,232 | 11/1991 | Kondo | 358/906 |
| 5,086,345 | 2/1992 | Nakane et al. | 358/909 |
| 5,130,813 | 7/1992 | Oie et al. | 358/909 |
| 5,150,219 | 9/1992 | Fukushima | 358/909 |
| 5,153,783 | 10/1992 | Tamada et al. | 358/906 |
| 5,161,026 | 11/1992 | Mabuchi et al. | 358/909 |
| 5,258,847 | 11/1993 | Yamada et al. | 358/906 |
| 5,424,772 | 6/1995 | Aoki et l. | 358/335 |

*Primary Examiner*—Thai Tran
*Attorney, Agent, or Firm*—Robin, Blecker & Daley

[57] ABSTRACT

An image recording apparatus of the kind having both a still-image recording circuit and a moving-image recording circuit comprises: an optical system arranged to guide image pickup light from an object to an image sensor; a driving circuit arranged to drive the optical system; and a control circuit arranged to cause the still image recording circuit to automatically record at least two or more still images by varying the optical system for each of the still images in recording the still images by using the still-image recording circuit.

16 Claims, 29 Drawing Sheets

FIG. 9

| DEPTH d | 0~5 | ~10 | ~15 | ~20 | ~25 | ~30 | ~35 | MORE THAN 35 |
|---|---|---|---|---|---|---|---|---|
| AGC GAIN | G0 | G0 | G1 | G1 | G1 | G2 | G3 | G4 |

G0 < G1 < G2 < G3 < G4

F I G. 21
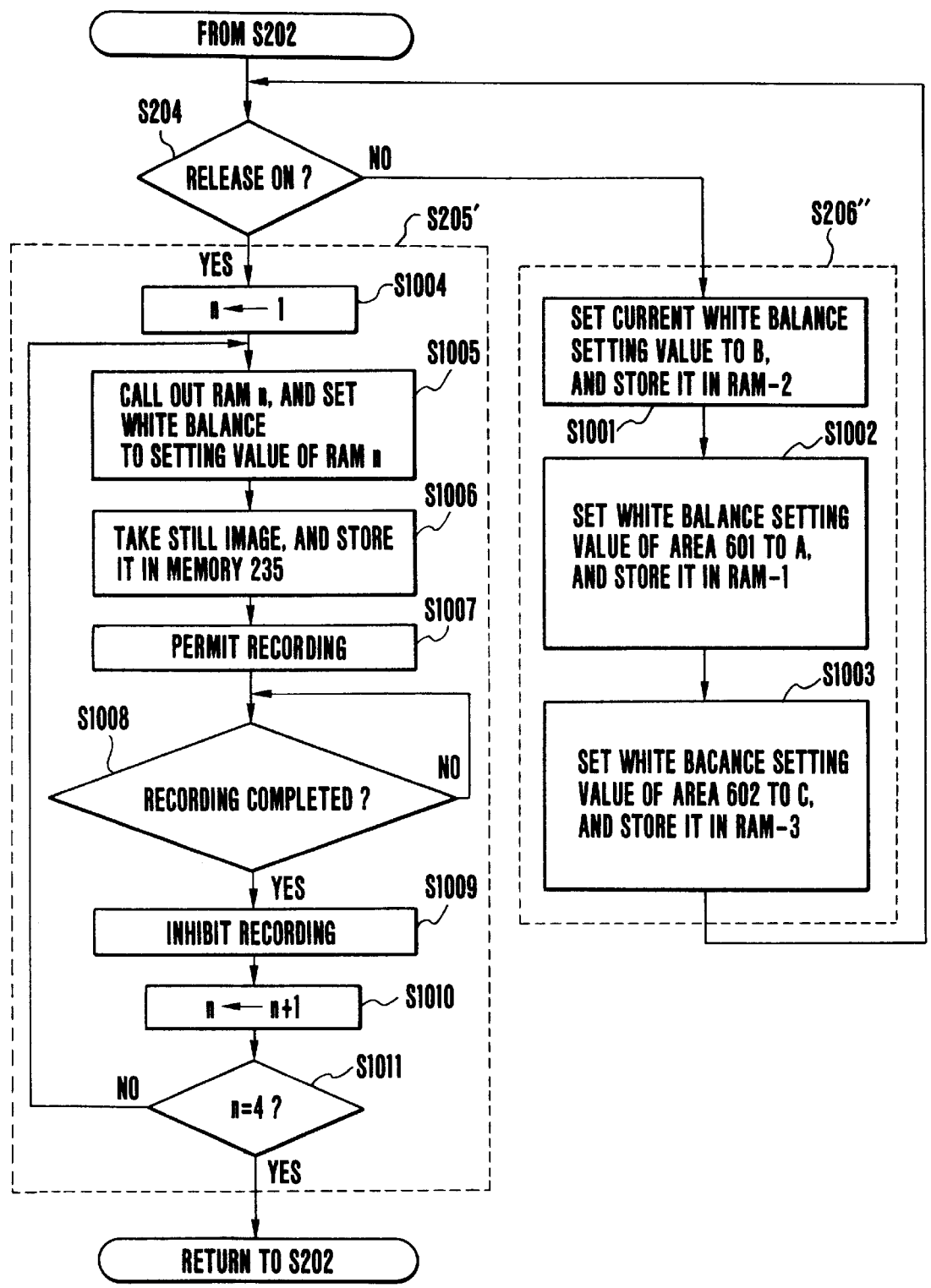

IMAGE RECORDING APPARATUS

This is a continuation application under 37 CFR 1.62 of prior application Ser. No. 07/936,121 filed Aug. 27, 1992 (abandoned).

BACKGROUND OF THE INVENTION

1. Field of the Invention

This invention relates to an image recording apparatus arranged to be capable of recording not only moving images but also still images.

2. Description of the Related Art

In the field of magnetic recording, a demand for high density recording has increased of late. To meet this demand, video tape recorders (hereinafter referred to as VTRs) have come to be arranged to perform magnetic recording at a higher density by lowering the traveling speed of a magnetic tape employed as a recording medium.

The lower traveling speed of the tape, however, brings about the following problem: If an audio signal is recorded with a fixed head, for example, it is impossible to make the relative speeds of the tape and the fixed head sufficiently high. The quality of reproduced sounds degrades under such a condition. In one of methods for solving this problem, the length of recording tracks to be handled with a rotary head on the tape is extended to be longer than the conventional length and an audio signal which has been time-base compressed is recorded within the extension areas of the tracks one after another.

More specifically, this method is carried out as follows: It has been practiced to wrap the magnetic tape at least 180 degrees around a rotary cylinder which carries rotary heads in a rotary 2-head helical scanning type VTR. Whereas, in accordance with this method, the tape is wrapped at least (180+θ) degrees around the rotary cylinder; and an audio signal which has been pulse-code modulated (PCM) and time-base compressed is recorded within the additional wrapping part θ.

FIG. 1 shows the tape transport system of the VTR of the above-stated kind. FIG. 2 shows recording tracks formed on a magnetic tape by the VTR of FIG. 1. In these figures, a reference numeral 1 denotes the magnetic tape. A numeral 2 denotes a rotary cylinder. Numerals 3 and 4 denote heads mounted on the rotary cylinder 2. A numeral 5 denotes video signal recording areas of the recording tracks formed on the tape 1. A numeral 6 denotes a PCM audio signal recording area of the recording track. The video signal recording area 5 is arranged to be traced by the heads 3 and 4 within the angle range of 180 degrees around the rotary cylinder 2 and the PCM audio signal recording area to be traced within the angle range of θ around the rotary cylinder 2.

A method for recording a still image within the PCM audio signal recording area 6 in the form of a digital signal has been proposed as an application example of the method of recording a digital signal in another area while a video signal is recorded within one area as mentioned above. Information about a still image can be completely recorded on the magnetic tape by scanning a plurality of the above-stated PCM signal recording areas 6, if a single still image is to be recorded. This method not only permits still image shooting by using the same recording medium as the recording medium used by the conventional apparatus for shooting a moving image but also makes it possible to obtain a still image of a higher picture quality than such a still image that is obtainable by reproducing a video signal from one and the same track by stopping the tape travel in the conventional VTR.

However, the prior art example described above has had the following drawbacks because it has been arranged to perform still image shooting by using a lens system and a lens control system which are intrinsically designed for shooting moving images:

(1) In shooting moving images, reproduced images can be prevented from giving any disagreeable impression, for example, by slightly moving the camera to correct an initial defocus state, even in cases where the lens is out of focus in the initial stage or where the focus is on a wrong object due to perspective confusion. Whereas, in the case of still image shooting, the quality of the reproduced image degrades unless shooting is performed in an adequate in-focus state for every frame.

(2) In a system designed intrinsically for the moving image shooting, automatic focusing is performed only to avoid giving a disagreeable impression. Hence, the algorithm of the automatic focusing is not always arranged to be suitable also for the still image shooting.

(3) The moving-image taking camera systems for general consumers are arranged without any function of adjusting the focus by giving priority to the depth of field in general, because this function is not absolutely necessary for such camera systems. In the case of still image shooting, however, it is difficult to obtain images as desired under some conditions without the above-stated function which gives priority to the depth of field.

Further, the conventional camera of the kind mentioned above also has presented the following drawbacks with respect to white balance adjustment control:

(1) If the object happens to change suddenly at the instant of taking a shot of a still image, the white balance adjustment (adjustment of hue) fails to follow the change. In such a case, the shot is apt to be taken to give an image which differs from the actual color of the object in hue, saturation, etc.

(2) In the event of the so-called wash-out which results, for example, from a sudden change in the color temperature of a light source, a short period of time is necessary for reproduction of the actual color. A still image taken before the lapse of this period of time comes to present an unnatural color.

(3) It has been practiced to adjust the white balance by causing the average of color signals of one image plane to become white. Therefore, it has been sometimes impossible to reproduce the color of a part of the image plane. For example, in the case of taking a still image shot of a person standing in front of a large red building, a red color is judged to be white. In this case, the skin color of the person becomes unnatural.

The conventional camera further has had the following drawbacks with respect to exposure control:

In shooting moving images, any wrong aperture position that results from inadequate light measurement during a certain period can be corrected by a generally employed process such as back-light correction or changing the angle of view without giving any disagreeable impression to the viewers of the moving images. Whereas, in the case of still image shooting, once a shot is taken at an inadequate aperture, it is difficult to correct the image not only during the process of shooting but also at the time of reproduction.

Further, the aperture control for the moving image shooting is generally performed to optimize the levels of video signals outputted from an image sensor and also from a signal processing circuit after the image sensor by feeding back information on the output signal level to a diaphragm driving circuit. This arrangement, however, tends to bring about a back-light state or a wash-out state depending on which part of the image plane is used for light measurement.

A particularly important problem lies in that: In recording a still image, only one aperture position is selectable for each moment of shot. If still image shooting is performed depending solely on an automatic aperture adjustment device, therefore, it would sometimes be impossible to make an exposure as desired.

Further, in taking a shot of a still image with an electronic still video camera having a zoom lens, it has been practiced to decide the angle of view by sighting an image within a viewfinder or by seeing moving images on a monitor in the same manner as in the case of moving image shooting. However, the conventional electronic still video camera has shown the following drawbacks:

(1) It is difficult to compare the images of one and the same object obtained at different angles of view because the images of different angles of view cannot be simultaneously seen.

(2) Use of many components such as zoom lens driving system, etc., increases power consumption, which seriously affects the shootable number of frames, because of the limited battery capacity available for the electronic still camera.

(3) In a case where images obtained by moving image shooting are to be monitored, the internal heat generation of the apparatus increases. The internal head then might deteriorate the picture quality of the images recorded. Any attempt to solve this problem by increasing a heat discharging ability would inevitably make the external size of the apparatus larger.

SUMMARY OF THE INVENTION

In view of the above-stated drawbacks of the prior art, it is an object of this invention to provide an image recording apparatus which is arranged to be capable of adequately recording a still image irrespective of exposure conditions.

An image recording apparatus arranged as an embodiment of this invention and to have still image recording means as well as moving image recording means comprises: depth-of-field adjusting means for setting the depth of field of a lens system; and control means for causing at least two or more still images to be automatically recorded by changing the depth of field in recording still images by the still image recording means.

This embodiment is arranged to take shots of still images at preset depths of field one after another every time a release button is pushed in taking shots of still images. Therefore, after the still image shooting, it is possible to extract from among the still images taken only the best of them or to compose a plurality of pictures into a picture by editing them through an image processing action, so that reproduced pictures having a wide dynamic range of depths of field can be obtained.

Further, the arrangement to continuously take shots by changing the depth of field effectively compensates for a focus deviation due to perspective confusion or the like. In addition to this advantage, image storing time can be set to be longer than one vertical synchronizing period by using a field or frame memory. The use of the field or frame memory thus enables the embodiment to more effectively perform the depth-of-field priority shooting.

It is another object of the invention to provide an image recording apparatus which is arranged to be capable of giving reproduced images with a natural hue in taking shots of still images even in the event of a sudden change in the object or in the color temperature of a light source, so that the drawback of the prior art in respect of white balance control as mentioned in the foregoing can be eliminated.

To attain this object, an image recording apparatus which is arranged according to this invention to be capable of selectively performing either moving image recording or still image recording by taking shots of a shooting object comprises: hue adjusting means for making hue adjustment according to the color data of the object; white balance adjusting means for controlling white balance when the hue adjusting means makes the hue adjustment; instructing means for issuing an instruction for still image recording; and control means arranged to cause at least two or more still images to be recorded on a recording medium by setting the white balance at two or more different values through the white balance adjusting means, in response to the instruction from the instructing means every time the instruction is issued once.

In one mode of this embodiment, the plurality of setting values of white balance which are to be set by the control means include a white balance value decided by the hue adjusting means and other white balance values which are set by shifting and differentiating only the red, blue or green component of the image in a preset ratio with the white balance value decided by the hue adjusting means used as a reference value.

An image recording apparatus arranged in another mode of this embodiment is provided with detecting means for detecting the color temperature of a light source illuminating the object. In this case, the control means is arranged to vary the above-stated white balance value in accordance with the color temperature of the light source detected by the detecting means.

In a further mode of the embodiment, the control means includes white balance setting means for setting one after another white balance values corresponding to a plurality of areas obtained within one pickup image plane by dividing the image plane. The above-stated two or more still images are recorded at the plurality of white balance values which correspond to the divided areas and are set by the white balance setting means.

In the case of the above-stated embodiment, when a shutter release button is pushed in the mode of still image shooting, still images are taken as a plurality of pictures by changing the white balance setting value from one value over to another, using a plurality of preset white balance values set before shooting. After the still image shooting, therefore, it is possible either to extract only a good picture from among the pictures thus taken or to combine and compose the plurality of pictures through an image processing action into a reproduced picture having a most natural hue.

It is a further object of this invention to provide an image recording apparatus which is arranged, in view of the drawbacks of the prior art mentioned in the foregoing, to be capable of recording a still image irrespective of exposure conditions.

To attain that object, an image recording apparatus which has still image recording means and moving image recording means and is arranged as an embodiment of this invention comprises: aperture adjusting means for adjusting an aperture value according to the quantity of light incident upon an optical system; and control means for causing at least two or more still images to be automatically recorded by varying the aperture value when still images are to be recorded by operating the still image recording means.

With the embodiment arranged in this manner, at the time of still image shooting, the embodiment takes shots of still images at preset aperture values one after another every time a release button is pushed. After shooting, therefore, it is possible either to extract only a good picture from among others or to combine a plurality of pictures by editing through an image processing action into a picture. The embodiment is thus arranged to give reproduced pictures having a wide dynamic range.

To attain the above-stated object relative to the exposure, another embodiment of this invention comprises: light measuring means arranged to be capable of carrying out a plurality of light measuring methods; and means for recording a plurality of still images respectively under different recording conditions based on the measured light values obtained by the plurality of light measuring methods of the light measuring means.

The above-stated embodiment is capable of continuously recording still images one after another under different recording conditions determined by the different light measuring methods.

It is a further object of this invention to provide a power-saving type still image recording apparatus which is arranged, in view of the drawbacks of the prior art mentioned in the foregoing, to permit simultaneous monitoring of images obtained at different angles of view by a camera having a zooming function.

To attain this object, a still image recording apparatus arranged as an embodiment of this invention comprises: optical means arranged to give a plurality of still images obtained at different angles of view without varying the position of an image point; storing means for storing the plurality of still images; display means arranged to read out the plurality of still images from the storing means and to simultaneously display the still images; and recording means arranged to select one still image from among the plurality of still images displayed and to record the still image selected.

The embodiment is thus arranged to be capable of displaying the images obtained at different angles of view in a multiple picture displaying manner and to record a still image of a desired angle of view selected from among the still images of different angles of view.

These and other objects and features of this invention will become apparent from the following detailed description of embodiments thereof taken in connection with the accompanying drawings.

BRIEF DESCRIPTION OF THE DRAWINGS

FIG. 9 is an illustration showing a fourth embodiment of the invention.

FIG. 21 is a flow chart showing in detail the procedures of the standby process and the still image shooting process of a ninth embodiment of the invention.

DETAILED DESCRIPTION OF THE PREFERRED EMBODIMENTS

The embodiments of this invention are described in detail below:

Embodiment 1

Figure 3:
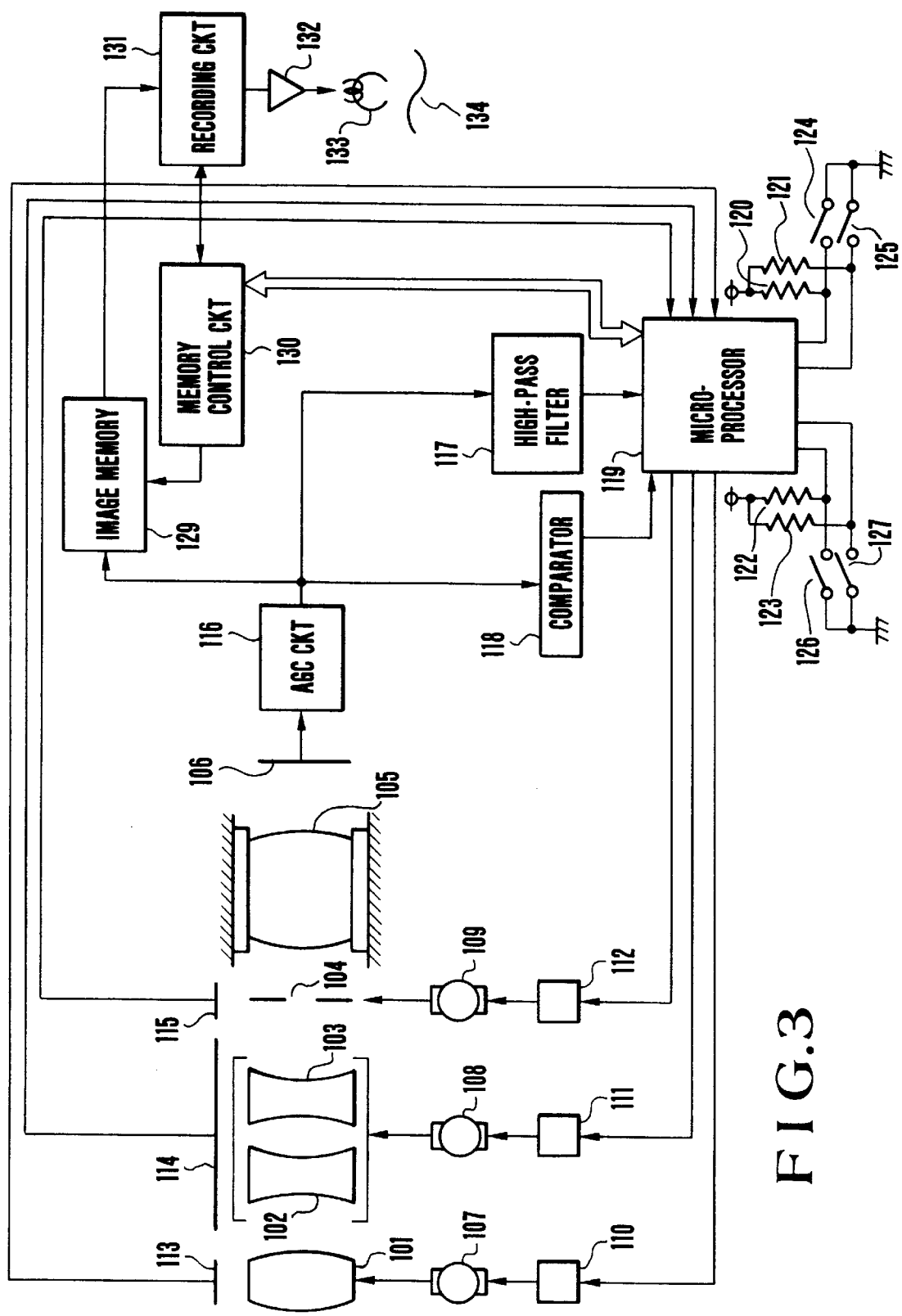
FIG. 3 is a block diagram showing in outline the arrangement of an embodiment of this invention.

FIG. 3 is a block diagram showing a first embodiment of this invention. The illustration includes a first lens group 101 which is arranged to make focus adjustment; a variator lens 102; a compensator lens 103; a diaphragm 104; a fourth lens group 105 which is fixed; and an image sensor 106.

The embodiment is provided with motors 107, 108 and 109 for focus adjustment, magnification adjustment and aperture adjustment, respectively. Drivers 110, 111 and 112 are arranged to drive respectively the motors 107, 108 and 109. Encoders 113, 114 and 115 are arranged to detect lens positions and the aperture position of the diaphragm 104.

A reference numeral 116 denotes an automatic gain control (abbreviated to AGC) circuit. A numeral 117 denotes a high-pass filter. A numeral 118 denotes a comparator which is arranged to output a measured light value signal for focus adjustment. A numeral 119 denotes a microprocessor. Numerals 120, 121, 122 and 123 denote pull-up resistors, respectively. A numeral 124 denotes a zoom telephoto switch. A numeral 125 denotes a zoom wide-angle switch. A numeral 126 denotes a release button for still image shooting.

A mode selection switch 127 is provided for switching between a normal still image shooting mode and a bracketing still image shooting mode which is peculiar to this embodiment. The term "bracketing still image shooting mode" as used herein means a mode in which, in performing the still image shooting, a plurality of still images are recorded by gradually changing the shooting conditions for each of the still images.

The illustration further includes a still image memory 129; a memory control circuit 130; a recording circuit 131 which is arranged to convert still image information read out from the image memory 129 into a recordable video signal; a recording amplifier 132; a magnetic head 133; and a magnetic tape 134.

Figure 4:
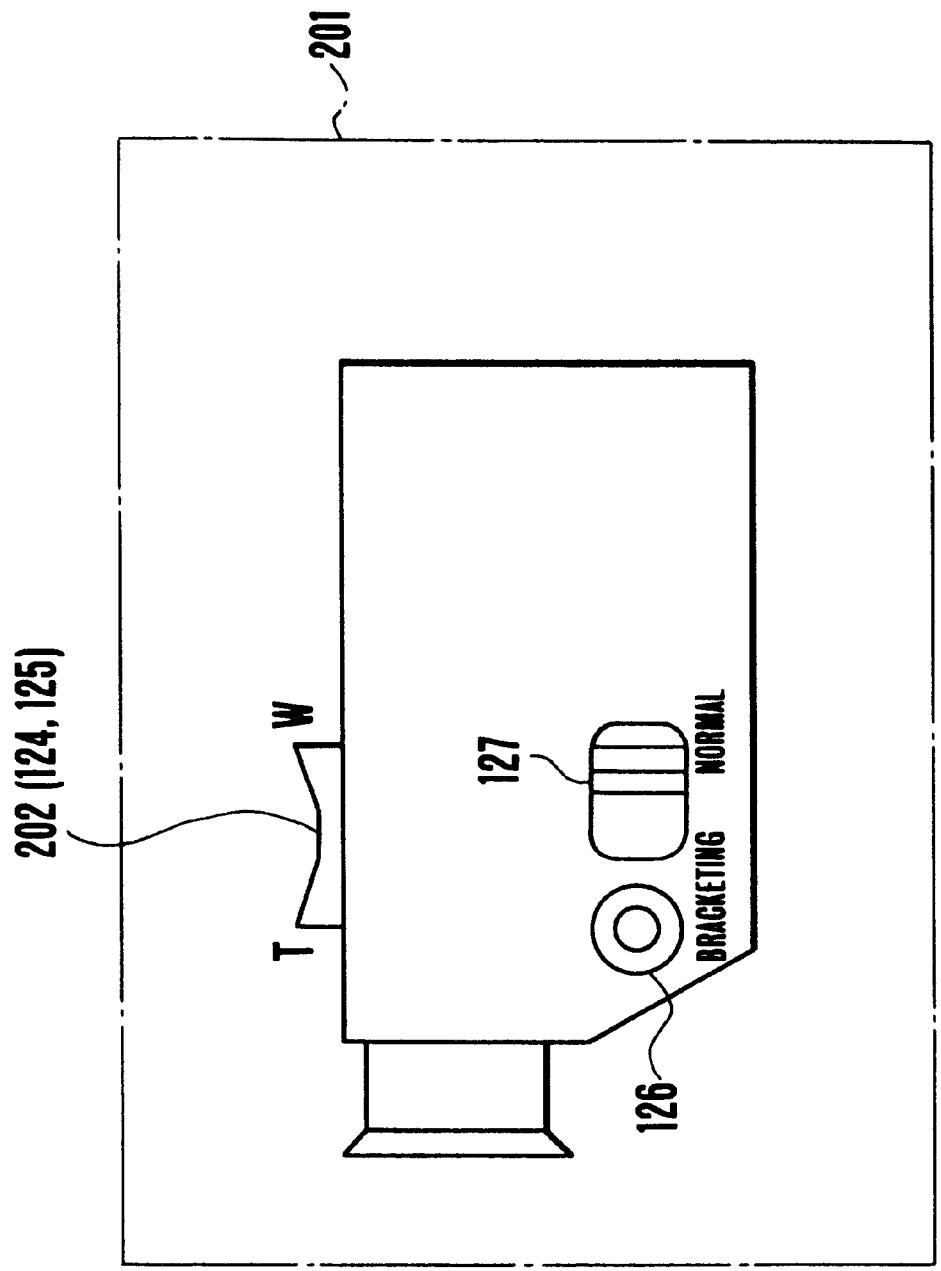
FIG. 4 is an outside appearance view showing the arrangement of the same embodiment as a whole.

FIG. 4 shows the appearance of this embodiment, showing its arrangement as a whole. In FIG. 4, a reference numeral 201 denotes the VTR of this embodiment as a whole. A numeral 202 denotes a zoom switch which is arranged to function in the same manner as the switches 124 and 125 shown in FIG. 3. A numeral 126 denotes a release button which is provided for still image shooting and is the same as the release button 126 of FIG. 3. A numeral 127 denotes the above-stated mode selection switch which is provided for switching between the bracketing still image shooting mode and the normal still image shooting mode (see FIG. 3). When this switch 127 is set on one side "bracketing", the depth of field changes to a preset value every time the release button 126 is pushed and a shot of a still image is taken under that preset condition. The details of this action will be described later herein with reference to FIG. 5.

Figure 5:
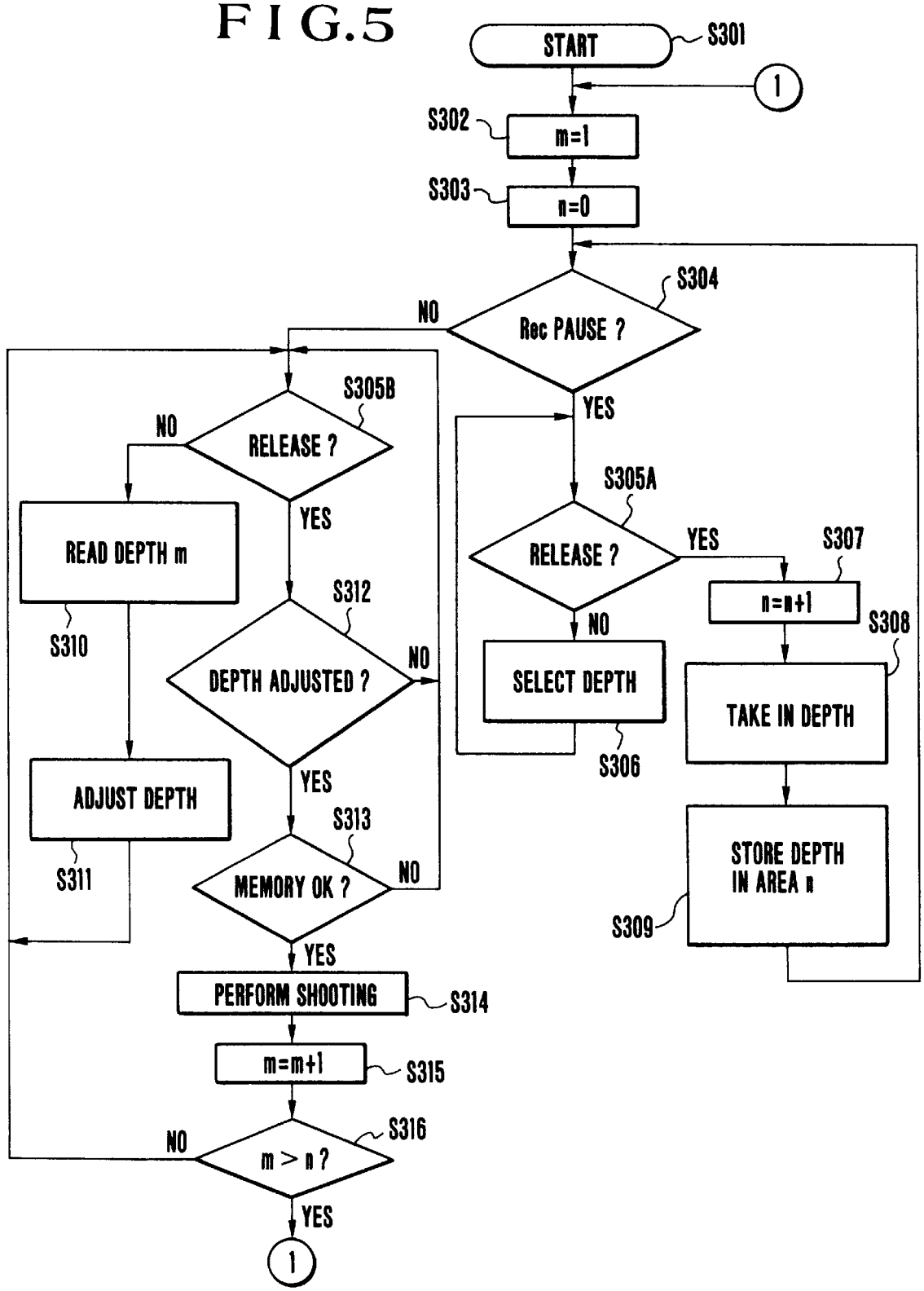
FIG. 5 is a flow chart showing the control procedures of the same embodiment.
Figure 6:
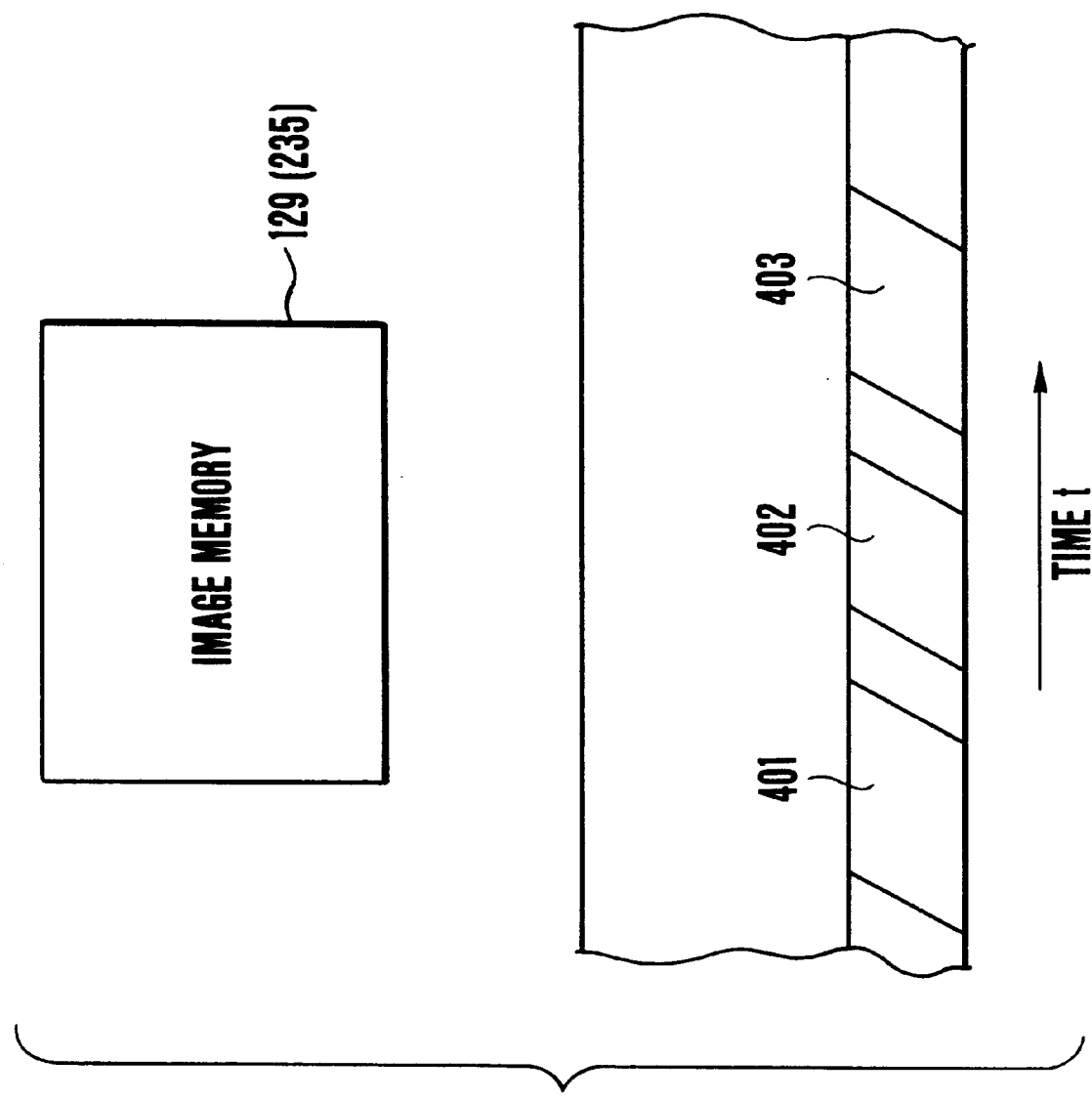
FIG. 6 shows recording areas which are to be used on a magnetic tape by the same embodiment.

FIG. 5 is a flow chart showing the procedures for the execution of the bracketing still image shooting mode. FIG. 6 shows a recording state obtained on the magnetic tape 134 when the bracketing still image shooting is performed. In FIG. 6, a reference numeral 129 denotes an image memory which is a field memory or frame memory for temporarily storing a still image. When the release button 126 is pushed, an image obtained at that very instant is taken into the image memory 129. The signal of the image thus taken in is recorded in the PCM area in the same manner as the prior art example described in the foregoing. In this instance, still images consecutively obtained in this manner are serially recorded in different areas in the order of areas 401, 402 and 403 beginning with the first still image. Normally, this process of recording requires a period of time between ten-odd and scores of vertical synchronizing periods.

Next, processing procedures for the bracketing still image shooting are described below by steps S301 to S316 of the flow chart shown in FIG. 5:

At a step S301: The flow of procedures begins to be executed. At steps S302 and S303: Counters m and n are reset respectively at "1" and "0". At a step S304: A check is made to find if recording is held in pause by a known standby function which is not shown (hereinafter referred to as a rec-pause state). If so, the flow proceeds to a step S305A to make a check to find if the release button 126 has been pushed. If not, the flow comes to a step S306. At the step S306: The photographer is supposed to be selecting a depth of field and the flow comes back to the step S305A to have the standby state continued. If the release button 126 is found to have been pushed at the step S305A, the flow comes to a step S307. At the step S307: The value of the counter n is incremented by one. The flow comes to a step S308. At the step S308: Information on the depth of field is taken in. At a step S309: The information on the depth of field is stored in an applicable n-th storage area.

After an n number of values of the depth of field have been stored in the above-stated manner, the flow comes back to the step S304. When the rec-pause state is found to have been canceled, the flow comes to a step S305B. At the step S305B: A check is made to find if the release button 126 has been pushed. If not, the flow comes to a step S310. At steps S310 and 311: While the release button 126 is not pushed, m-th depth-of-field data is read out in accordance with the sequence of the values of the depth of field stored at the step S309. The aperture position of the diaphragm, etc., are adjusted on the basis of the value of the data read out.

When it is confirmed at the step S305B that the release button 126 is pushed, the flow comes to a step S312. At the step S312: A check is made for completion of the process of adjusting the aperture, etc., performed at the step S311. If the adjustment process has not been completed, the flow comes back to the step S305B to inhibit any release action. Further, if the process of the aperture adjustment, etc., is found to have been completed at the step S312, the flow comes to a step S313. At the step S313: A check is made for the image memory 129. If it is decided, from the output of the memory control circuit 130 and that of the recording circuit 131, that the contents of the memory 129 must not be changed because of incompletion of the recording process on the information stored in the image memory 129 or because of some other reason, the flow also comes back to the step S305B to inhibit the release action.

When the writing of the image signals into the image memory 129 is permitted with the above-stated conditions having been satisfied, the flow comes to a step S314. At the step S314: The output of the image memory 129 is recorded on the magnetic tape 134 through the recording circuit 131, the recording amplifier 132 and the magnetic head 133. After that, the flow comes to a step S315 to increment the value of the counter m by one.

At a step 316: The value of the counter m is checked to find if the process of shooting all the set number of still images has been completed. If not, the flow comes back to the step S305B to repeat the steps mentioned above until the completion of the shooting process. If the shooting process is found to have been completed at the step S316, the flow comes back to the step S302 to make the VTR ready for next shooting.

Embodiment 2

Figure 7:
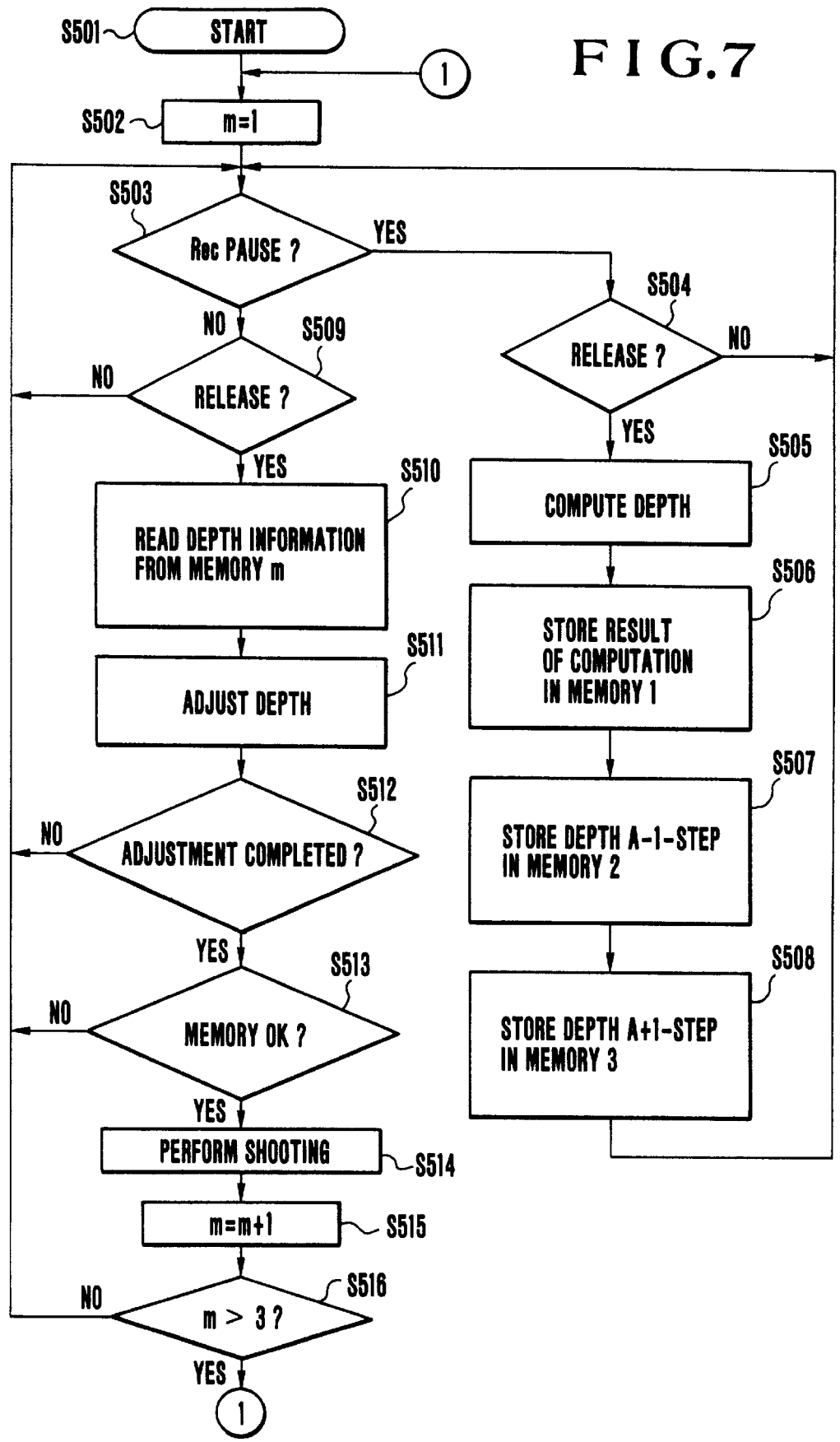
FIG. 7 is a flow chart showing the control procedures of a second embodiment of the invention.

FIG. 7 is a flow chart showing the operation of a second embodiment of this invention. In this case, the shooting operation is performed by changing the depth of field as much as a preset width of the depth of field relative to such conditions as the aperture, etc., that have been judged to be appropriate by the camera.

Referring to FIG. 7, the flow of operation procedures begins at a step S501. At a step S502: The value of the counter m is reset at "1". At a step S503: A check is made for the rec-pause state. If the VTR is in the rec-pause state, the flow comes to a step S504. At the step S504: A check is made to find if the release button 126 is pushed. If not, the flow comes back to the step S503 to repeat the steps S503 and S504. If the button 126 is pushed, the flow comes to a step S505 to store depth-of-field conditions by executing a series of steps beginning with the step S505.

At the step S505: The depth of field is computed by reading an aperture value and a focal length included in shooting conditions automatically adjusted by the camera. At a step S506: The result of computation is stored in a memory 1. At a step S507: The value of a depth of field which is shallower by one step than the depth of field computed at the step S505 is set as an A−1 step depth value and conditions such as the aperture,.etc., apposite to the A−1 depth value are computed. The results of computation are stored in a memory 2. At a step S508: The value of a depth of field which is deeper by one step than the depth of field computed at the step S505 is set as an A+1 step depth value. Then, like the step S507, conditions such as the aperture, etc., apposite to the A+1 step depth value are computed and stored in a memory 3.

The conditions for the variable depth-of-field bracketing still image shooting are completely set through the steps described above. Therefore, the flow comes back to the step S503 for the execution of shooting.

Upon confirmation of the fact that the rec-pause state is canceled at the step S503, the flow comes to a step S509 to wait for a pushing operation on the release button 126. When the release button 126 is pushed, the flow comes to a step S510. At the step S510: Information on the m-th depth-of-field setting value is read out from the memory. At a step S511: The depth of field is adjusted. At a step S512: A check is made to find if the depth-of-field adjustment has been completed. If so the flow comes to a step S513. At the step S513: A check is made to find if it is allowable to rewrite the contents of the memory. If so, the flow comes to a step S514 to have the shooting operation carried out on the memory. At a next step S515: The value of the counter m is incremented by one. At a step S516: A check is made to find if the shooting operation has been completed for all the set conditions. If so, the flow comes back to the step S502 to reset the counter m at "1" and wait for a next instruction for bracketing still image shooting. If not, the flow comes back to the step S503 to repeat the flow of processes from the step S503 as described above.

With the second embodiment arranged as described above, shooting can be performed at three different depths of field, including a depth of field which is apposite to an aperture value automatically determined by the camera and depths of field which are deeper and shallower than the apposite depth of field. Therefore, even in a case where there are a plurality of objects at different object distances within one and the same picture or image plane, the invented arrangement effectively lessens the possibility of such a photographic failure that results from a perspective confusion.

Another advantage of the second embodiment lies in that, in the event of a vigorously moving object, the arrangement of automatically taking still image shots of one and the same object at different depths of field in the neighborhood of the apposite depth of field permits selection of a still image which is closest to an in-focus state among the still images thus obtained.

Embodiment 3

Figure 8:
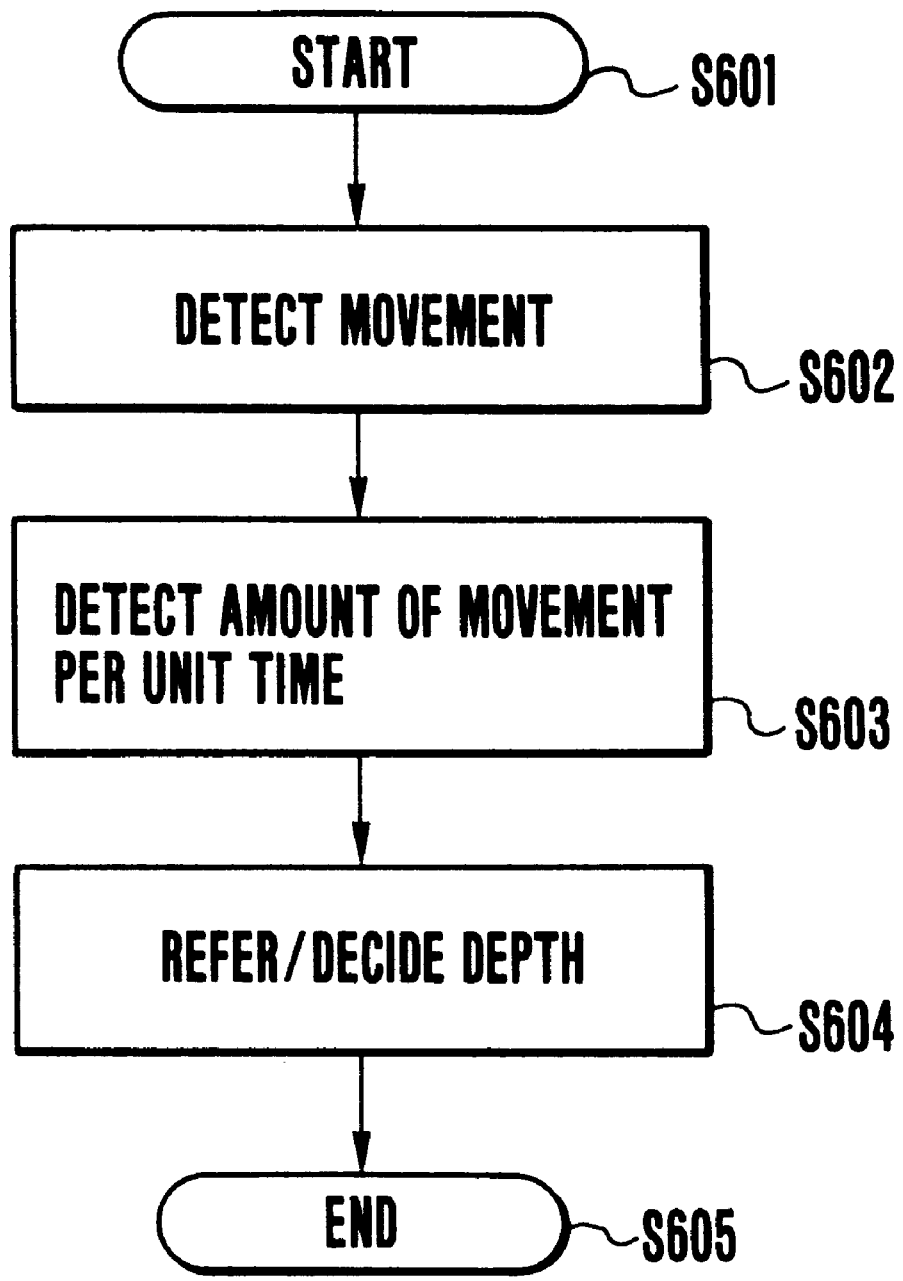
FIG. 8 is a flow chart showing the control procedures of a third embodiment of the invention.

FIG. 8 shows in a flow chart a third embodiment of this invention. The third embodiment is arranged to determine the depth of field by detecting the movement of the object. Referring to FIG. 8, a step S601 represents a block at which the algorithm of the embodiment begins to be executed. At a step S602: The movement of the object is detected either by a tracking action or a digital processing action. At a step S603: The moving speed of the object is detected. At a step S604: An optimum depth of field is determined from the result of detection made by the step S603 with reference to a table or the like.

According to the algorithm shown in FIG. 8, the moving speed of the object is detected; the depth of field is determined according to how far the object moves within a period of time before commencement of the still image shooting after a shutter release button is pushed; then a plurality of depths of field are set with the determined depth of field set in the middle; and shots of a plurality of still images are thus taken on the basis of these depths of field. Therefore, even if the optimum depth of field determined at the step S604 is somewhat inaccurate, there is a great probability that the plurality of still images thus obtained include a still image taken at an appropriate depth of field.

It is another advantage that the quality of the still images is variable as desired by making the depths of field deeper and shallower for the same object.

Further, since a technology for predicting the movement of a moving object has recently made a salient progress, the exposure time for shooting can be variously determined according the result of such prediction.

Embodiment 4

FIG. 9 shows a fourth embodiment of the invention. In varying the depth of field according to this invention, if the depth of field is changed by means of the diaphragm 104 (see FIG. 3), it is sometimes impossible to obtain a good image due to an inadequate amount of exposure. To solve this problem, the fourth embodiment is arranged such that the gain of the AGC circuit 116 (FIG. 3) which is arranged to amplify the signal output of the image sensor 106 is changed in relation to the depth of field determined (aperture value) in a manner as shown in FIG. 9, so that the signal can be obtained at a sufficiently high level.

With the fourth embodiment arranged in this manner, the depths of field can be set advantageously for shooting by controlling the aperture value. Further, with the gain of the AGC circuit 116 preset for the purpose of adjusting the signal level which is caused to fluctuate by the aperture of the diaphragm 104, the tracking action of the AGC circuit 116 can be quickened. Therefore, shooting can be adequately accomplished by absorbing the adverse effect of fluctuations of the amount of exposure caused by the control over the diaphragm 104.

Embodiment 5

Figure 10:
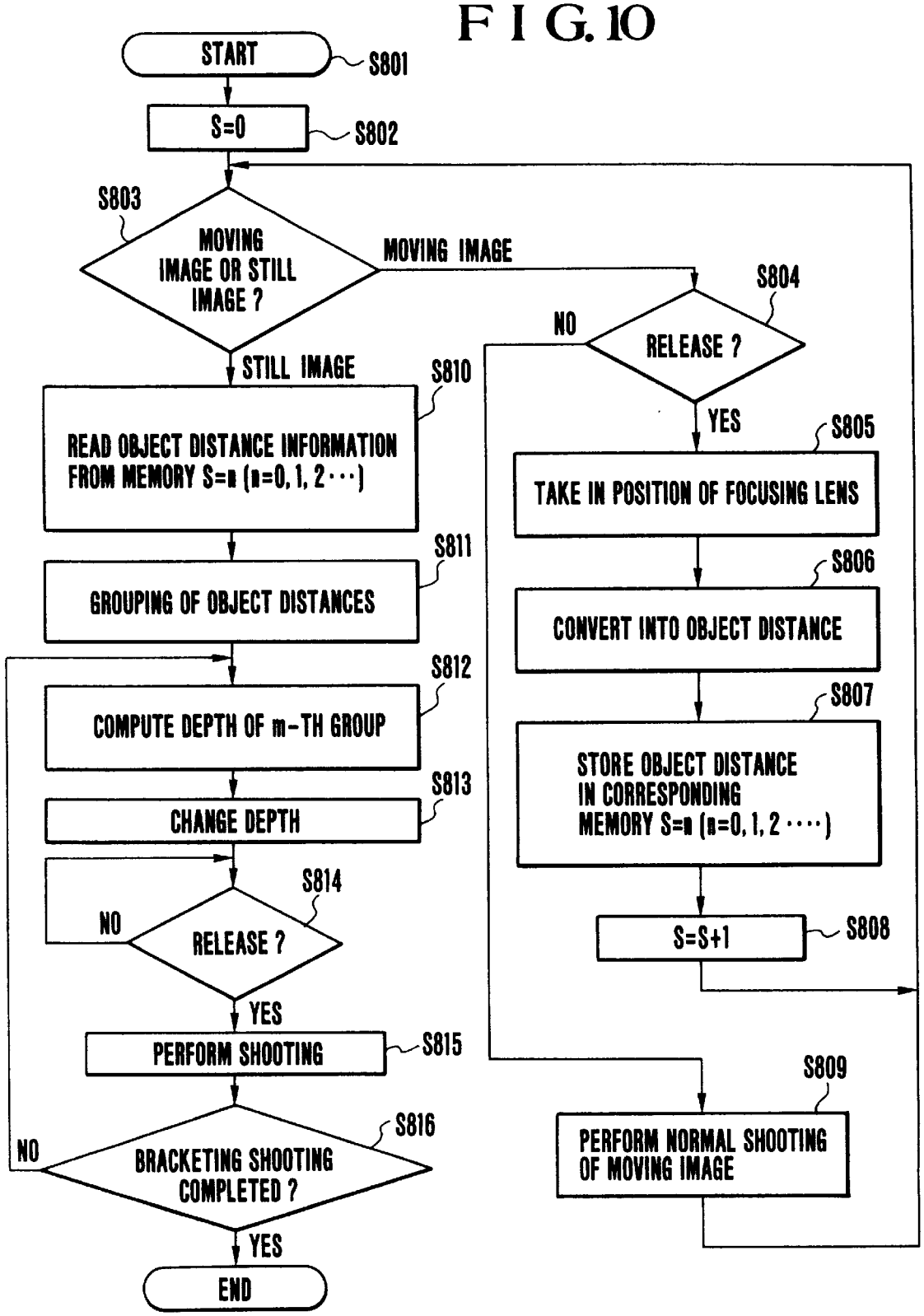
FIG. 10 is a flow chart showing the control procedures of a fifth embodiment of the invention.

FIG. 10 shows in a flow chart a fifth embodiment of this invention. The fifth embodiment is arranged to detect beforehand the spread of object distances spreading in the direction of distance through focusing means and to determine depths of field in such a way as to make them correspond to the spread of object distances detected.

Referring to FIG. 10, the flow begins at a step S801. At a step S802: A bracketing number counter S is reset. At a step S803: The shooting mode is checked for discrimination between moving image shooting and still image shooting. If the shooting mode is found to be the moving image shooting, the flow comes to a step S804. At the step S804, a check is made for the release button 126. The flow comes to a step S805 to perform the action of grasping the spread of object distances in the direction of distance only when the release button 126 is pushed. This spread grasping action is performed as follows: At the step S805, the lens is first focused on one object. After that, information on the focusing lens position is taken in. The flow then comes to a step S806. At the step S806, the object distance is arithmetically obtained from the focusing lens position. At a step S807: The object distance of an S-th object is stored. At a step S808: The value S is incremented by one. These steps are repeated a necessary number of times. The depth of field for shooting is determined according to the spread of the object distances stored at the step S807.

After the step S808, the flow comes back to the step S803. When the shooting mode is judged to be the still image shooting mode, the flow proceeds to a step S810. At the step S810: Information on object distances is read out. At a step S811: The object distances are grouped. The grouping is performed for the purpose of changing the depth of field in carrying out the bracketing still image shooting in such a way as to change it to the depth of field for an object located in the central part or for all the objects. Selection for this purpose is made by some suitable means not shown. At a step S812: Assuming that the object distances are thus divided into m groups, the depths of field are computed for the groups one after another beginning with a first group in the same manner as in the case of the first embodiment. At a step S813: The depths of field are changed. At steps S814 and S815: Still image shooting is performed.

At a step S816: A check is made to find if the still image shooting has been performed for all the m groups. If so, the sequence of processes comes to an end.

Embodiment 6

Figure 11:
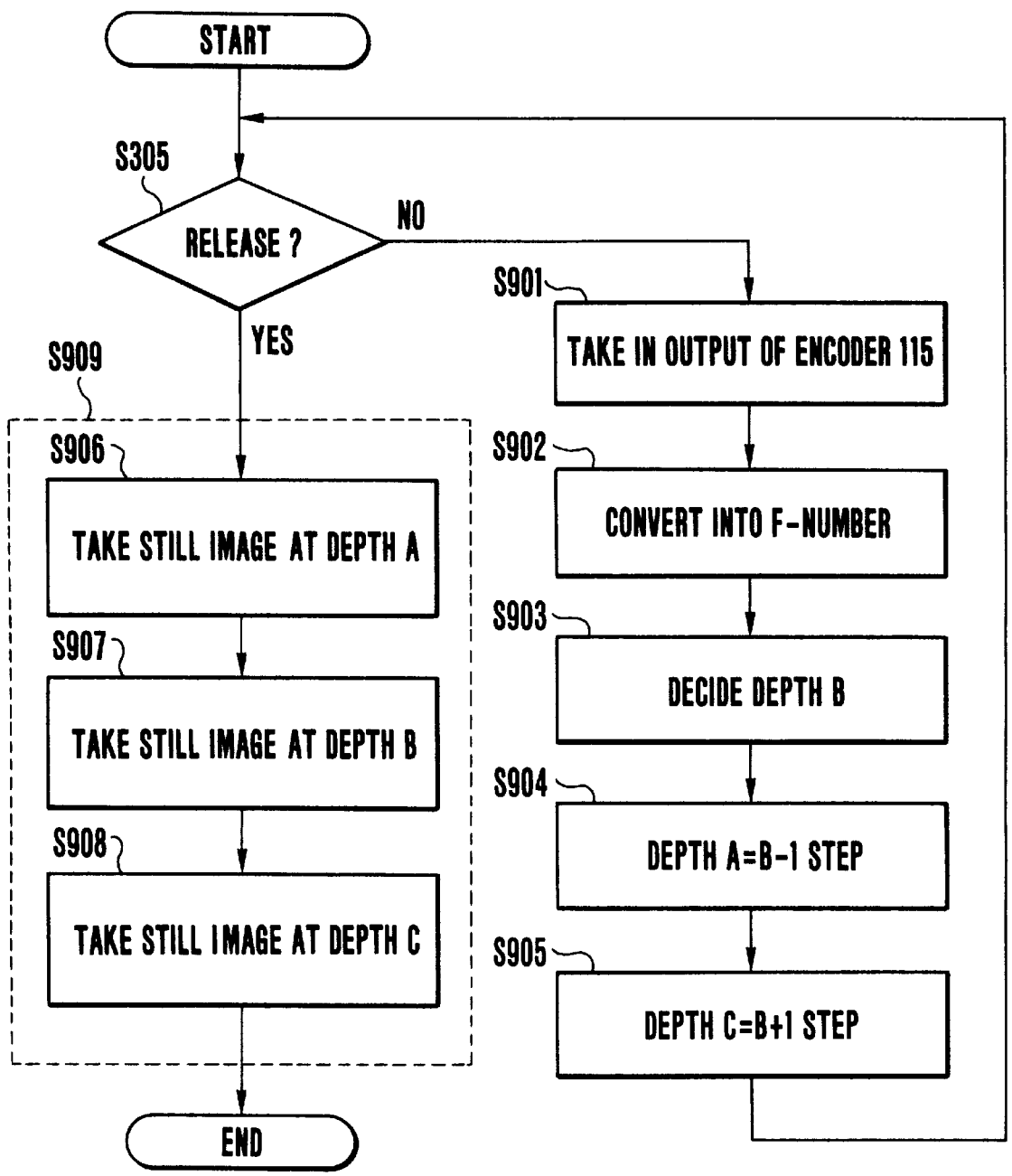
FIG. 11 is a flow chart showing the control procedures of a sixth embodiment of the invention.

FIG. 11 shows in a flow chart a sixth embodiment of this invention. The sixth embodiment is provided with a plurality of image memories and is arranged to store at a high speed a plurality of still images in these image memories every time the release button is pushed once.

Figure 12:
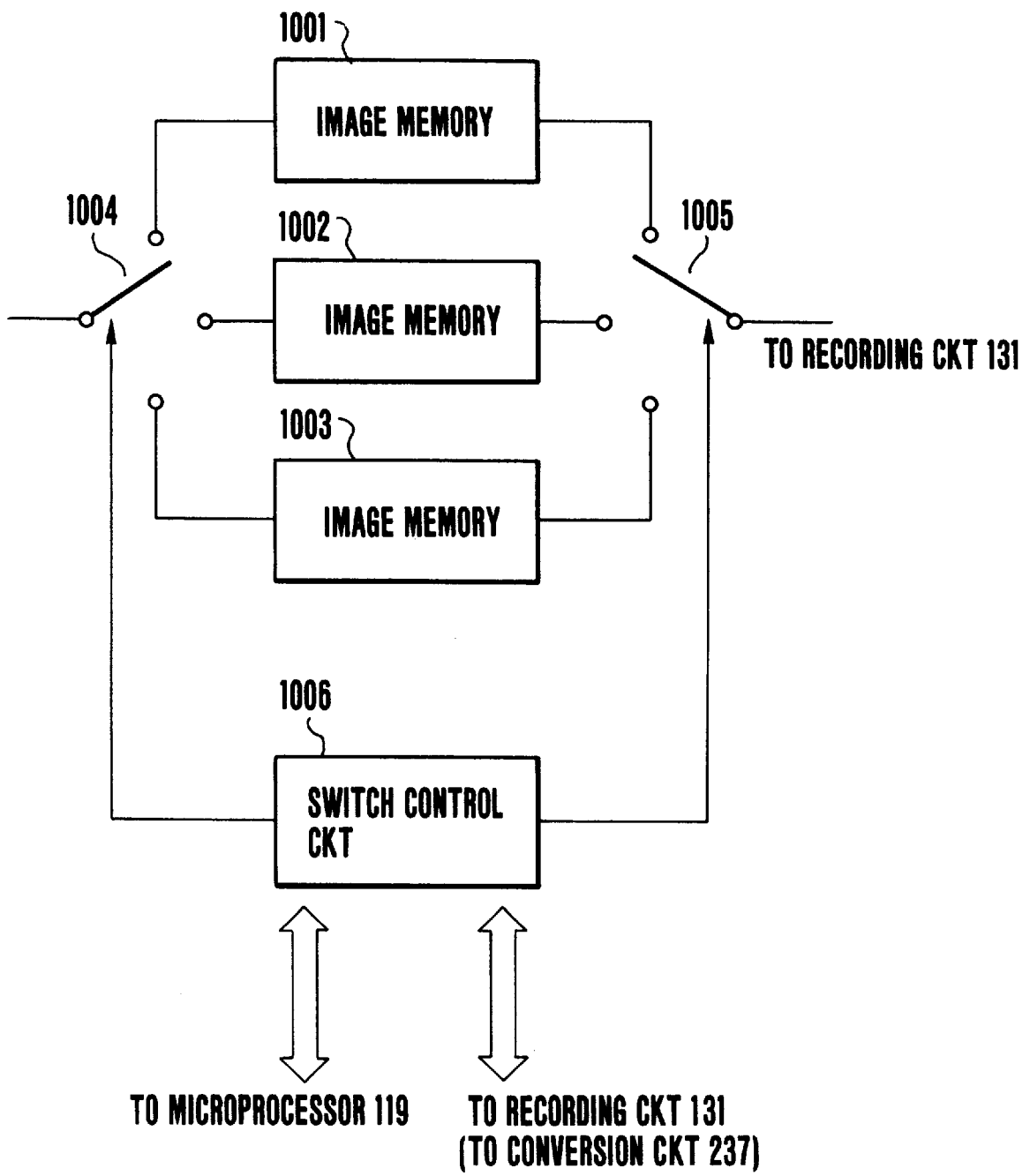
FIG. 12 is a block diagram showing the memory arrangement of the sixth embodiment shown in FIG. 11.

With a plurality of image memories used as in the case of this embodiment, the arrangement around the image memories becomes as shown in FIG. 12. Referring to FIG. 12, reference numerals 1001, 1002 and 1003 denote these image memories. A switch 1004 is arranged to select one of these image memories. Another switch 1005 is arranged to select one of these image memories for recording the contents of the image memories. A switch control circuit 1006 is arranged to control the switches 1004 and 1005 and to communicate with the microprocessor 119 and the recording circuit 131 (FIG. 3) as the switches 1004 and 1005 must be controlled in accordance with the timing of recording and that of the release button operation. The control procedures of the sixth embodiment are as described below with reference to FIG. 11:

At a step S901: The output of the aperture value encoder 115 is taken in. At a step S902: The output is converted into an F-number by the microprocessor 119. At a step S903: The current depth of field B is decided on the basis of the result of the step S902. At steps S904 and S905: Depths of field A and C are set at such values that respectively deviate from the above-stated depth B by one step (an offset value set by some suitable method relative to a reference depth of field) before and after the depth B. The flow of the control procedures waits for the pushing operation of the release button 126 while executing the steps S901 to S905. Further, the processes of the steps from S901 through S905 must be carried out at least once even in a case where the release button 126 is pushed in the moving image shooting mode, instead of the still image shooting mode.

When the VTR is found to be in a release state at the step S305 with the release button 126 pushed, the flow comes to a step S909 to execute processes of steps S906 to S908 included in the step S909. At the steps S906, S907 and S908: Three still images are obtained by making exposures respectively at the above-stated depths of field A, B and C.

As mentioned in the description of the prior art, still images are recorded in the PCM area or the like on the magnetic tape at the same head/tape relative speed as in the case of the moving image shooting. If the still images are recorded within a recording area corresponding to, for example, a wrapping angle range of 30 degree around the rotary head cylinder in the same manner as in the case of the conventional VTR, the recording would require several to scores of tracks, which necessitate a recording time of several to scores of vertical synchronizing (hereinafter called "sync" for short) periods.

Figure 13:
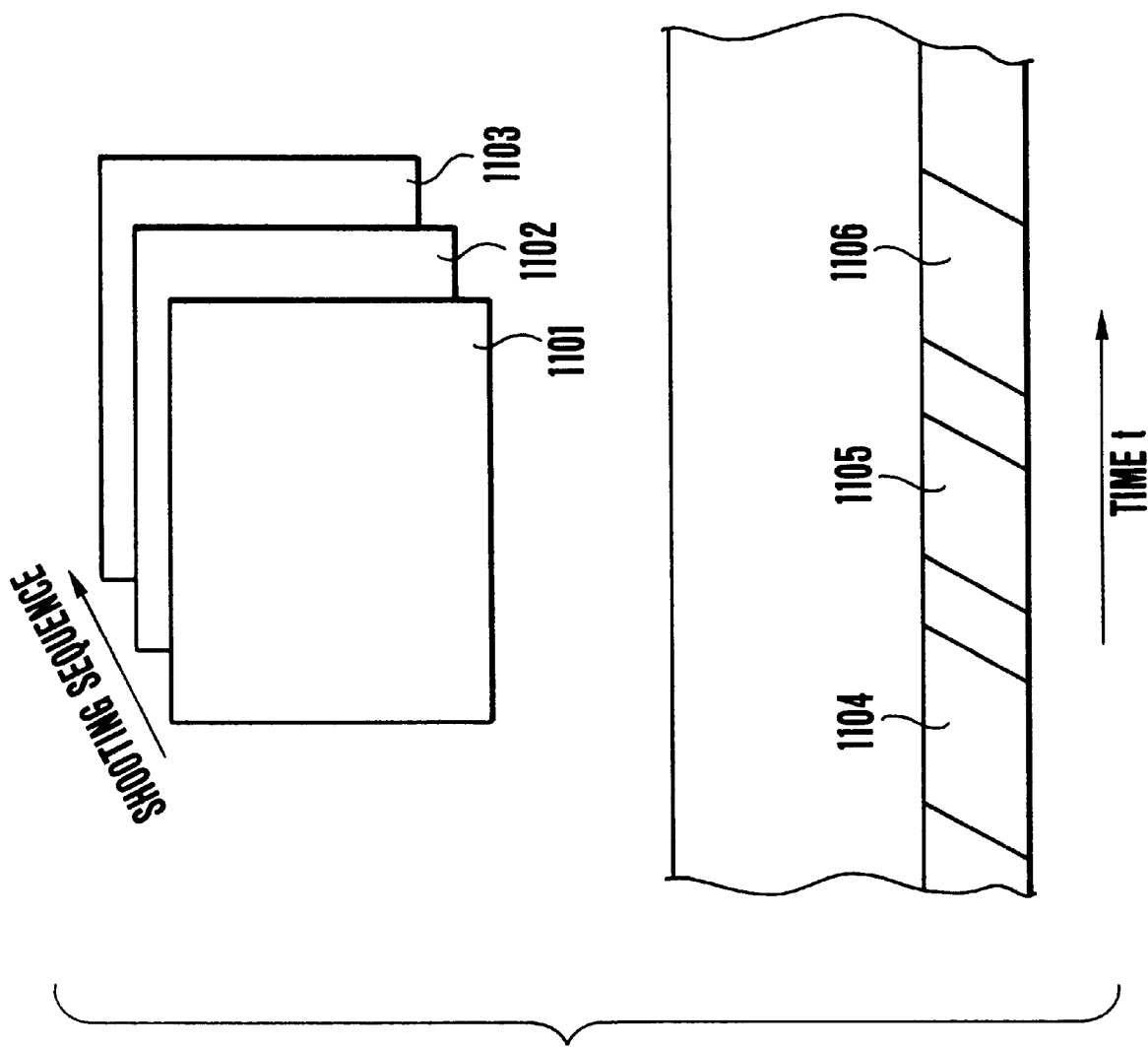
FIG. 13 shows recording areas to be used on a magnetic tape in a case where three memories are employed.

In order to secure any shutter opportunity, this recording time is excessively long. This problem can be solved, for example, by arranging memories 1101, 1102 and 1103 as shown in FIG. 13. The provision of a number of memories corresponding to the number of shots of the bracketing still image shooting or a minimum number of memories required for shooting without expanding the bracketing intervals, as determined from the recording time and the bracketing intervals, permits taking shots of the still images without missing any shutter opportunity.

Referring to FIG. 13, if two bracketing intervals are necessary in recording the still image of the memory 1101 in a PCM area 1104, still images are stored in other memories 1102 and 1103 while the image stored in the memory 1101 is being recorded in the PCM area 1104. Then, a fourth still image can be stored in the memory 1101 upon the completion of recording in the PCM area 1104. With the three memories arranged to be used in rotation in this manner, the bracketing still image shooting can be continuously performed as many times as desired.

The arrangement described above permits shooting not only at a depth of field apposite to an aperture value automatically decided by the camera but also at depths of field which are deeper and shallower than the depth of field automatically decided. Therefore, even in cases where a plurality of objects are located at different object distances within one and the same image plane, the probability of having a photographic failure due to a perspective distance confusion can be minimized. Further, in the event of a vigorously moving object, the shots of still images automatically taken in the neighborhood of an apposite depth of field make it possible to select, after shooting, one of the still images which is closest to a desired in-focus state among others.

Further, it is also possible to compose still pictures of a wide dynamic range of contrast by inputting reproduced images again into the plurality of memories and then by carrying out a digital process on them.

The arrangement of the embodiment described enables an image recording apparatus of the kind arranged to permit recording still images as well as moving images to take a plurality of still pictures by gradually changing the depth of field according to the liking of the photographer, the movement of the object or the distance to the object. Therefore, the images of objects existing within one and the same image plane are obtainable without any blur and yet without losing the promptness of shots. After shooting, it is possible to select the best of the shots or to eventually broaden the dynamic range with respect to the depth of field by combining images.

Further, in cases where bracketing still image shooting (shooting by changing exposure conditions for every shot of still image) is performed by using only one field or frame memory for taking in the still image, a release for shooting is inhibited when the contents of the memory cannot be rewritten as a previous image plane is still in process of recording. Such arrangement gives a reliable apparatus at a low cost.

The following describes other embodiments of this invention with reference to the drawings:

Embodiment 7

Figure 14:
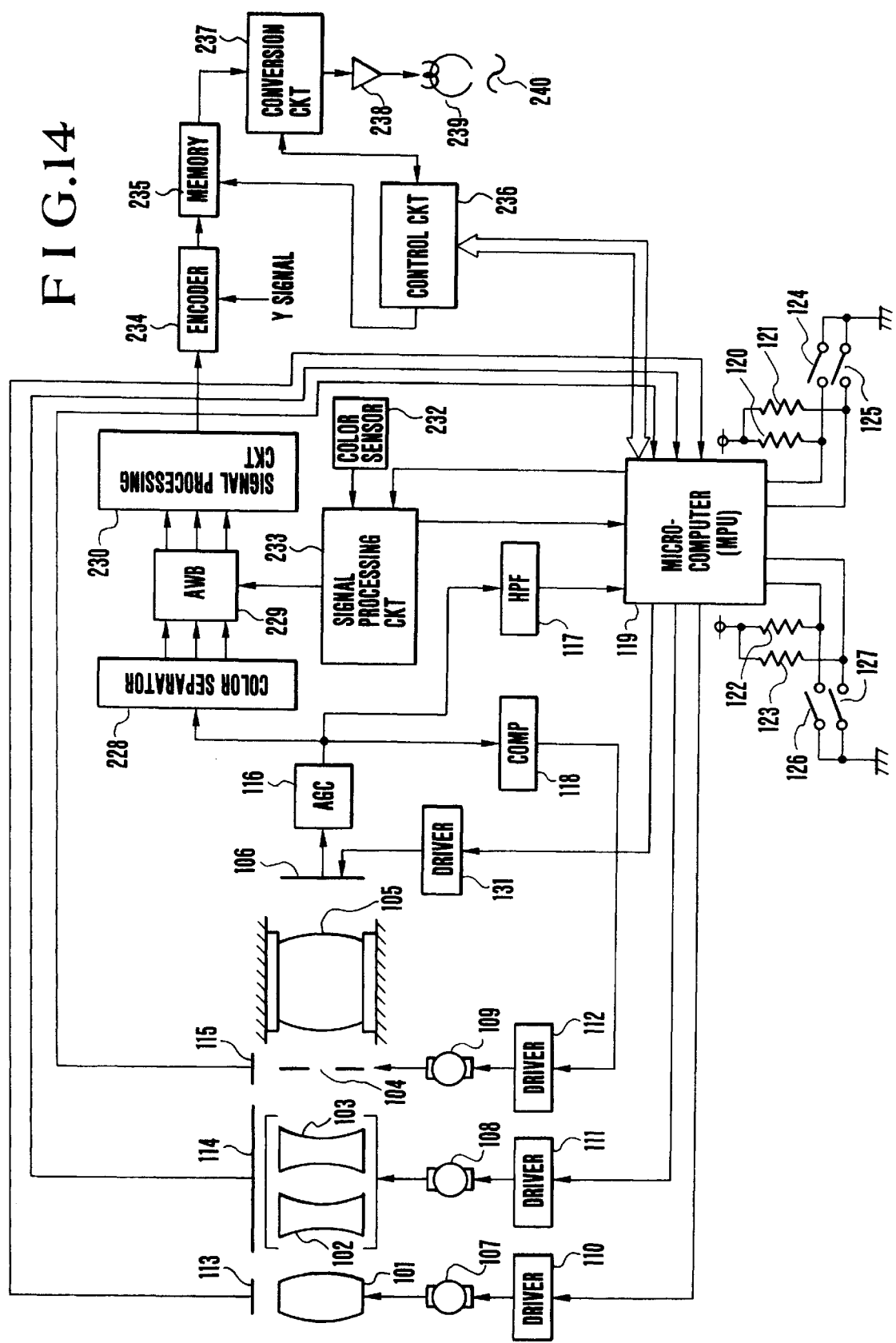
FIG. 14 is a block diagram showing the circuit arrangement of a video camera which is arranged according to the invention as a seventh embodiment thereof.

FIG. 14 shows the circuit arrangement of a video camera which is arranged according to this invention as a seventh embodiment thereof. The illustration includes a first lens group 101 which is for focus adjustment; a variator lens 102; a compensator lens 103; a diaphragm 104; a fourth lens group 105 which is fixed; an image sensor 106; motors 107, 108 and 109 which are for focus adjustment, magnifying power adjustment and aperture adjustment; drivers 110, 111 and 112 which are arranged to drive respectively the motors 107, 108 and 109; encoders 113, 114 and 115 which are respectively arranged to detect lens positions and an aperture position; an AGC (automatic gain control) circuit 116; a high-pass filter (HPF) 117; a comparator (COMP) 118 which is for aperture adjustment; a microcomputer (MPU) 119; pull-up resistors 120, 121, 122, 123 and 128; a zoom telephoto switch 124 and a zoom wide-angle switch 125; a mode selection switch 127 which is arranged to make switching between a still image shooting mode and a moving image shooting mode; and a release switch 126 for still image shooting.

A color separator 228 is arranged to extract color signals. A white balance (AWB) circuit 229 is arranged to adjust white balance. A signal processing circuit 230 is arranged to form color-difference signals and a color signal from the original color signals. A color sensor 232 detects the color temperature of a light source. A signal processing circuit 233 combines a signal outputted from the color sensor 232 with a signal from the microcomputer 219. An encoder 234 forms a signal in conformity to the NTSC system. An image memory 235 takes in a still image. A control circuit 236 controls the start of a recording action and a clearing action on the image memory 235 according to a release by the release switch (button) 126 and the timing or recording. A signal conversion circuit 237 converts the output of the image memory 235 into a signal of a form suited for recording on a magnetic tape 240. A reference numeral 238 denotes an amplifier and a numeral 239 a head.

In a case where the image memory 235 consists of a plurality of image memories, a circuit arrangement around these image memories becomes as shown in FIG. 12. The illustration includes image memories 1101, 1102 and 1103; a switch 1104 which is arranged to select one of the image memories for storing a still image; and a switch 1105 which is arranged to select one of the image memories the contents of which are to be read out for recording on the magnetic tape 140. Since it is necessary to synchronize the timing of recording with the timing of release in controlling the switches 1104 and 1105, the control circuit 236 is arranged to communicate with the microcomputer 119 and the signal conversion circuit 237.

Figure 1:
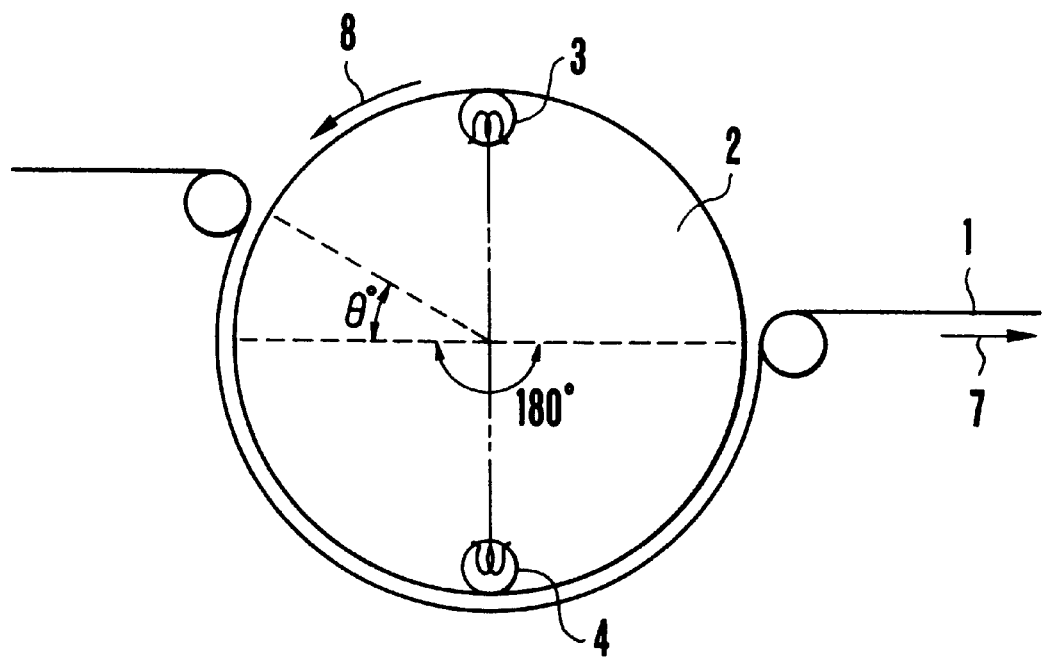
FIG. 1 shows the tape transport system employed in the conventional VTR.
Figure 2:
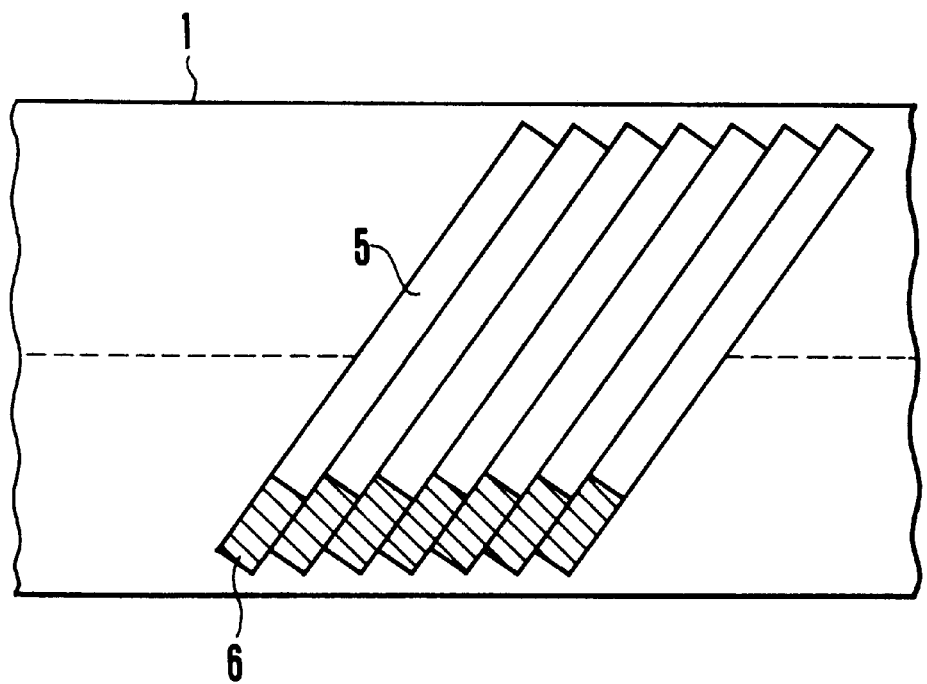
FIG. 2 shows recording tracks formed on a magnetic tape by the conventional VTR.

If the still images are recorded, at the same head/tape relative speed as in the moving image shooting mode, in the PCM audio signal recording areas arranged on the magnetic tape 140 as shown in FIGS. 1 and 2, with each PCM audio signal recording area assumed to correspond to a wrap angle range of 30 degrees around the rotary head cylinder, the recording time required would be a length of time for several to scores of recording tracks, which corresponds to several to scores of vertical synchronizing periods. A shutter opportunity tends to be missed during such a long recording time. Whereas, as described in the foregoing with reference to FIG. 12, use of the plurality of image memories 1101, 1102 and 1103 enables the photographer to seize the shutter opportunity because, after still image information is stored in a first memory, the still image information can be stored in a second memory without hastily recording it on the tape.

The seventh embodiment of this invention is arranged to set a plurality of white balance values in addition to a current white balance value determined by a hue adjusting (automatic white balance adjusting) function provided for moving image shooting. These additional white balance values are obtained by varying an original color signal mixing ratio respectively to predetermined extents. A plurality of still images are obtained by taking shots respectively on the basis of the different white balance values. The white balance setting action is performed by the microcomputer 119 according to a signal indicating the state of the signal processing circuit 233. More specifically, the microcomputer 119 sends a selection signal to the signal processing circuit 233 for setting the white balance values and controls the white balance circuit (AWB) 229 through the signal processing circuit 233.

Figure 15:
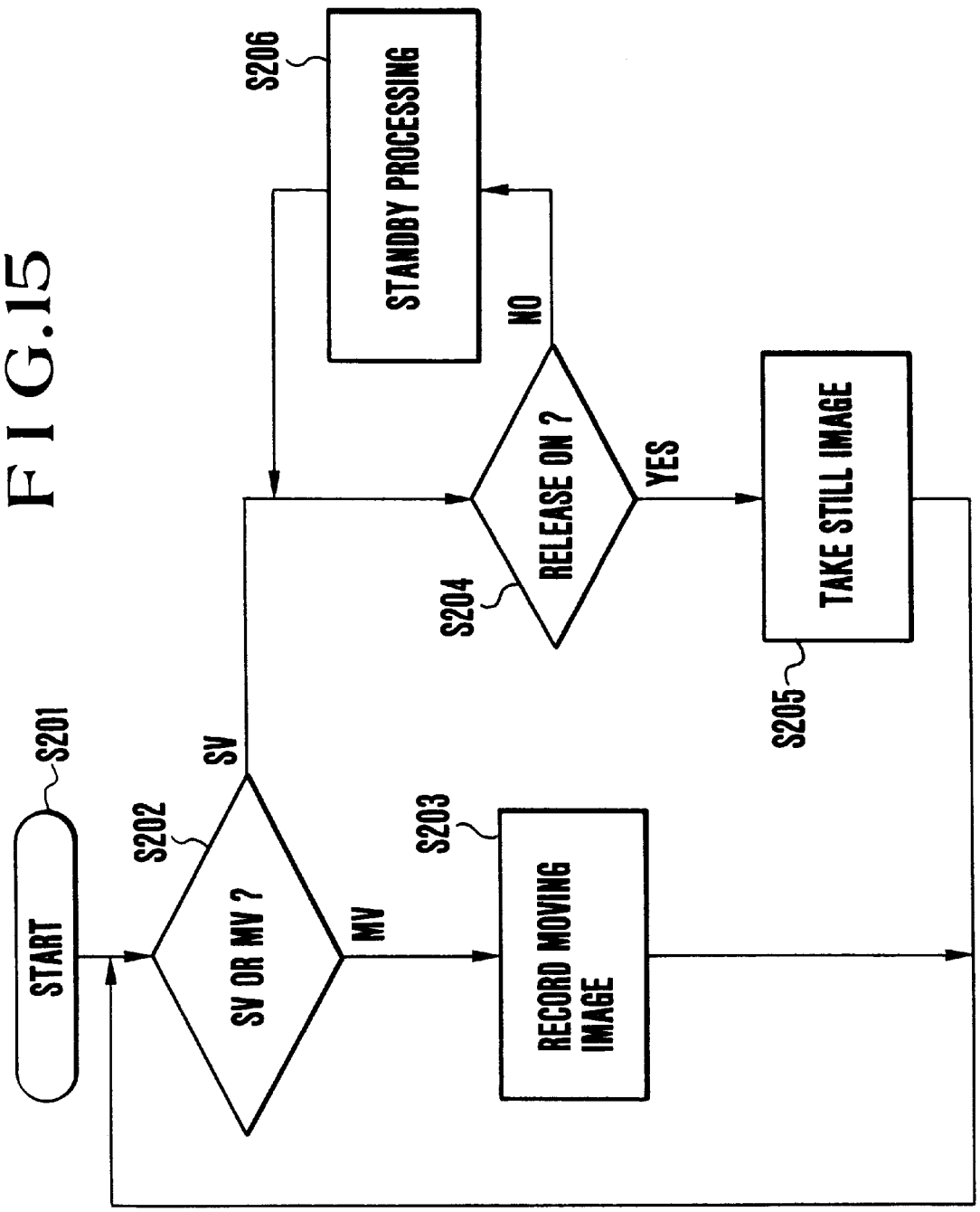
FIG. 15 is a flow chart showing the operation of the seventh embodiment of the invention as a whole.

Procedures for still image shooting are first described briefly as follows: The concept of the method for still image recording is as described in the foregoing with reference to FIG. 6. When the release button (or switch) 126 is pushed, a video signal obtained at that very instant is taken in the field or frame memory 235 which is arranged to temporarily store a still image. The video signal thus stored is recorded in the PCM recording area 6 in the same manner as mentioned in the prior art description. In this case, the still images are serially recorded in the areas 401, 402 and 403 beginning with a first still image. It is generally believed that this recording process takes a period of time which corresponds to ten-odd to scores of vertical sync periods. Further, the outer appearance of the camera of the seventh embodiment is arranged as described in the foregoing with reference to FIG. 4. FIG. 15 is a flow chart showing the operation of the seventh embodiment.

Referring to FIG. 15, a switch-over process program of the seventh embodiment begins at a step S201. At a step S202: A check is made either for the switching position of the shooting mode selection switch 127 or to find if the release switch 126 is pushed in the moving image shooting mode. A still image shooting mode SV or a moving image shooting mode MV is selected according to the result of the check. In other words, the step S202 not only includes the check for the switching position of the shooting mode selection switch 127 but also a further check for finding if the release button 126 is pushed. Even if the switching position of the switch 127 is found to be on the moving image shooting side, the still image shooting mode is selected if the release button 126 is found to be pushed. If the moving image shooting mode is selected, the flow comes to a step S203 to execute a moving image recording process. In the event of selection of the still image shooting mode, the flow comes to a step S204. At the step S204: A check is made to find if the release button 126 is pushed in the still image shooting mode. If so, the flow proceeds to a step S205 to execute a still image shooting process.

Figure 16:
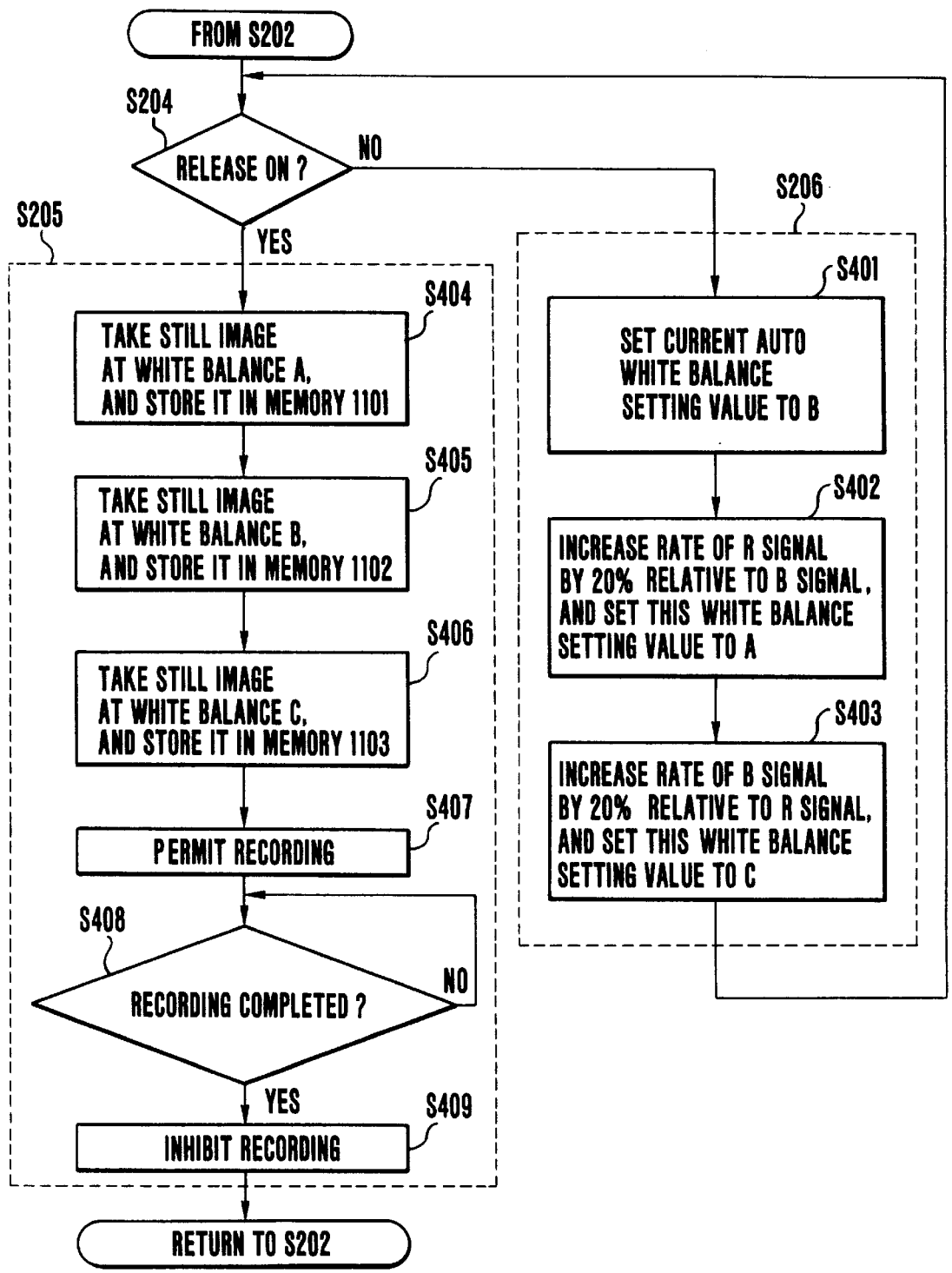
FIG. 16 is a flow chart showing in detail the procedures of a standby process and a still image shooting process to be performed by the seventh embodiment.

With the camera assumed to be provided with three image memories as shown in FIG. 12, for example, the flow of operation waits until the release button 126 is pushed after the still image shooting mode is selected at the step S202. During this waiting period, processes are executed at the step S206, for example, as shown in FIG. 16. Referring to FIG. 16, a white balance setting value which is currently set by the automatic white balance (AWB) circuit 229 is read out from the signal processing circuit 233 at a step S401. Then, this setting value is stored as a white balance value B at a part RAM-B in a RAM area within the microcomputer 119. At a next step S402: The white balance is adjusted in such a way as to increase the rate of a red (R) signal, for example, by 20% relative to the white balance value B set at the step S401 and the white balance value thus obtained is considered to be a white balance value A. The white balance value A is stored at a part RAM-A of the RAM area in the microcomputer 119. At a step S403: The white balance is likewise adjusted to relatively increase the rate of a blue (B) signal or a green signal, for example, by 20%. The white balance value thus obtained is considered to be a white balance value C and is stored at a part RAM-C of the RAM area in the microcomputer 119. The rate of changing the color at the steps S402 and S403 and the combination of colors are not limited to the above but can be set as desired. The flow waits until the release button 126 is pushed while continuing to execute the steps S401 to S403. In a case where the release button 126 is pushed in the moving image shooting mode, the steps S401 to S403 must be executed at least once.

When a release operation is considered to be performed with the release button pushed, the flow comes to the step S205 to execute the processes for still image shooting. The processes of the step S205 are executed by steps S404, S405, S406, S407, S408 and S409. At the steps S404, S405 and S406: The white balance setting values A, B and C are called out from the RAM of the microcomputer 119. Three still image shots are taken respectively at the white balance values A, B and C. Information on these images is stored respectively in the field memories 1101, 1102 and 1103. At the next step S407: Recording on the magnetic tape 240 is permitted. At the step S408: A check is made to find if the recording on the magnetic tape 240 is completed by making a check for the presence or absence of a recording completion signal from a field memory which is operating on a discrete program. If the recording is found to have been completed, the flow comes to the step S409 to inhibit further recording on the tape 240. The flow then comes back to the step S202 of FIG. 16. By the processes up to this point of flow, three still images of different white balance setting values are recorded with the release button 126 pushed once.

Figure 17:
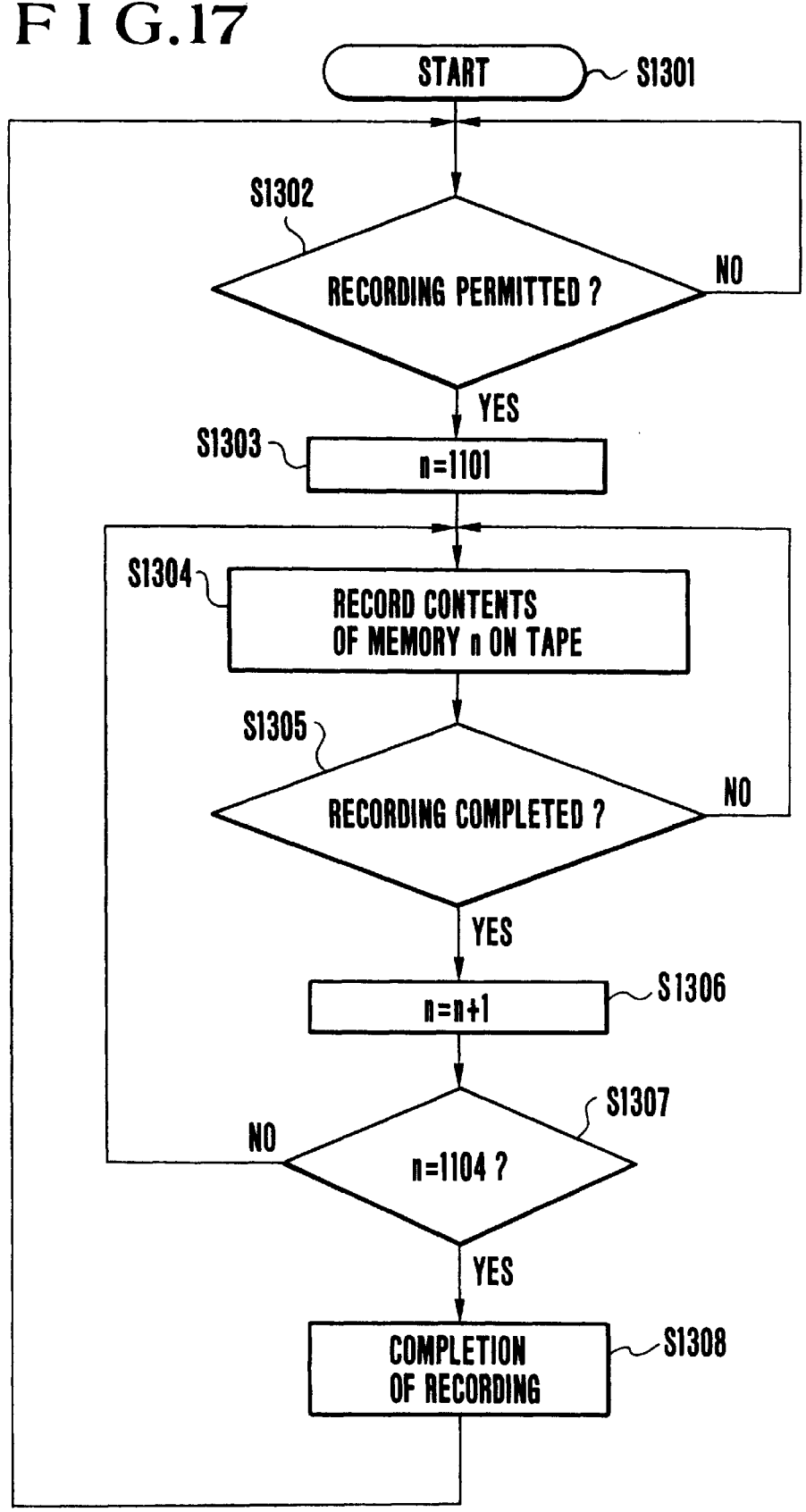
FIG. 17 is a flow chart showing the procedures for a recording action to be performed by the seventh embodiment on a magnetic tape.

Referring to the flow chart of FIG. 17, the action of recording still images on the magnetic tape 240 from the field memories 1101, 1102 and 1103 is briefly described by way of example as follows: The flow of the program begins at a step S1301. At a step S1302: A check is made to find if recording is permitted. If so, the flow comes to a step S1303. At the step S1303: The count value of a counter n is set at "1101". At a next step S1304: The contents of the memory n at an address indicated by the counter n is recorded in the area 6 (FIG. 2) on the magnetic tape 240. At a step S1305: A check is made to find if the recording on the magnetic tape 240 has been completed. If not, the flow comes back to the step S1304 to continue the process of the step S1304. Upon detection of completion of recording at the step S1305, the flow comes to a step S1306 to increment the count value of the counter n by one. The flow then comes to a step S1307. At the step S1307: A check is made to find if the count value of the counter n is "1104". If not, the flow comes back to the step S1304 to repeat the still image shooting processes (n=1102, 1103) from the step S1304. When the count value n becomes "1104" at the step S1307, the flow comes to a step S1308 to terminate the recording and to output a recording completion signal. The check for completion of recording is made at the step S408 of FIG. 16 as described in the foregoing. When the recording is judged to have been completed, the flow comes from the step S408 to the step S409. In the meantime, the flow of program of FIG. 17 comes from the step S1308 back to the step S1302 to continuously wait for a next recording permission.

According to the arrangement of the seventh embodiment described, the white balance is adjusted on the basis of the current white balance setting value which is automatically determined by the automatic white balance adjustment (AWB) to give still images which are respectively somewhat more bluish and more reddish than a still image which is obtained at the current white balance setting value. Therefore, even in cases where the object suddenly moves or where the light of a light source changes during the process of still image shooting, the plurality of still image shots taken at the different white balance setting values minimize the possibility of a photographic failure and, after shooting, enable the photographer to select one image which most naturally represents the hue of the object among the still images.

Embodiment 8

Figure 18:
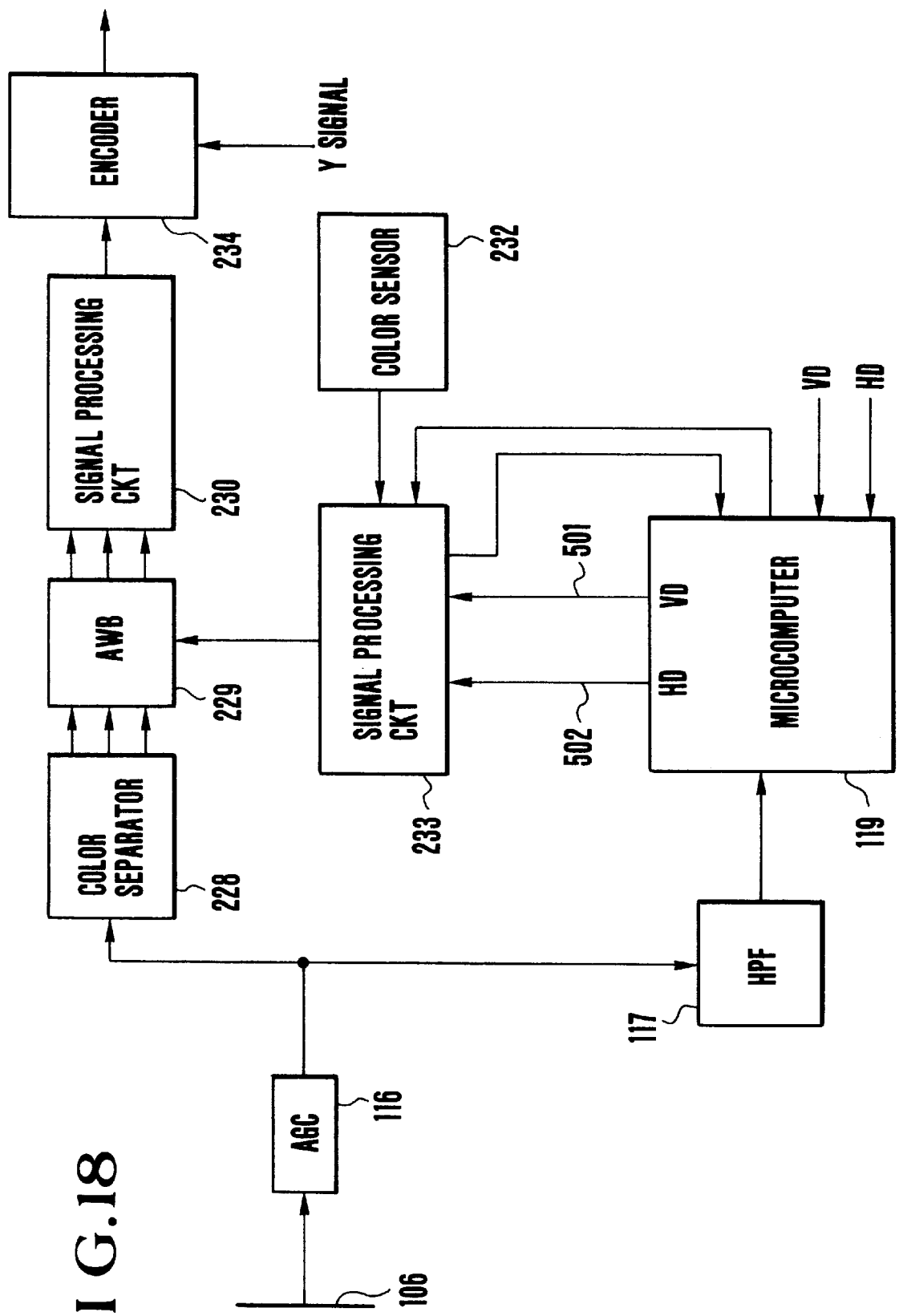
FIG. 18 is a block diagram showing the circuit arrangement of the essential parts of an eighth embodiment of the invention.
Figure 19:
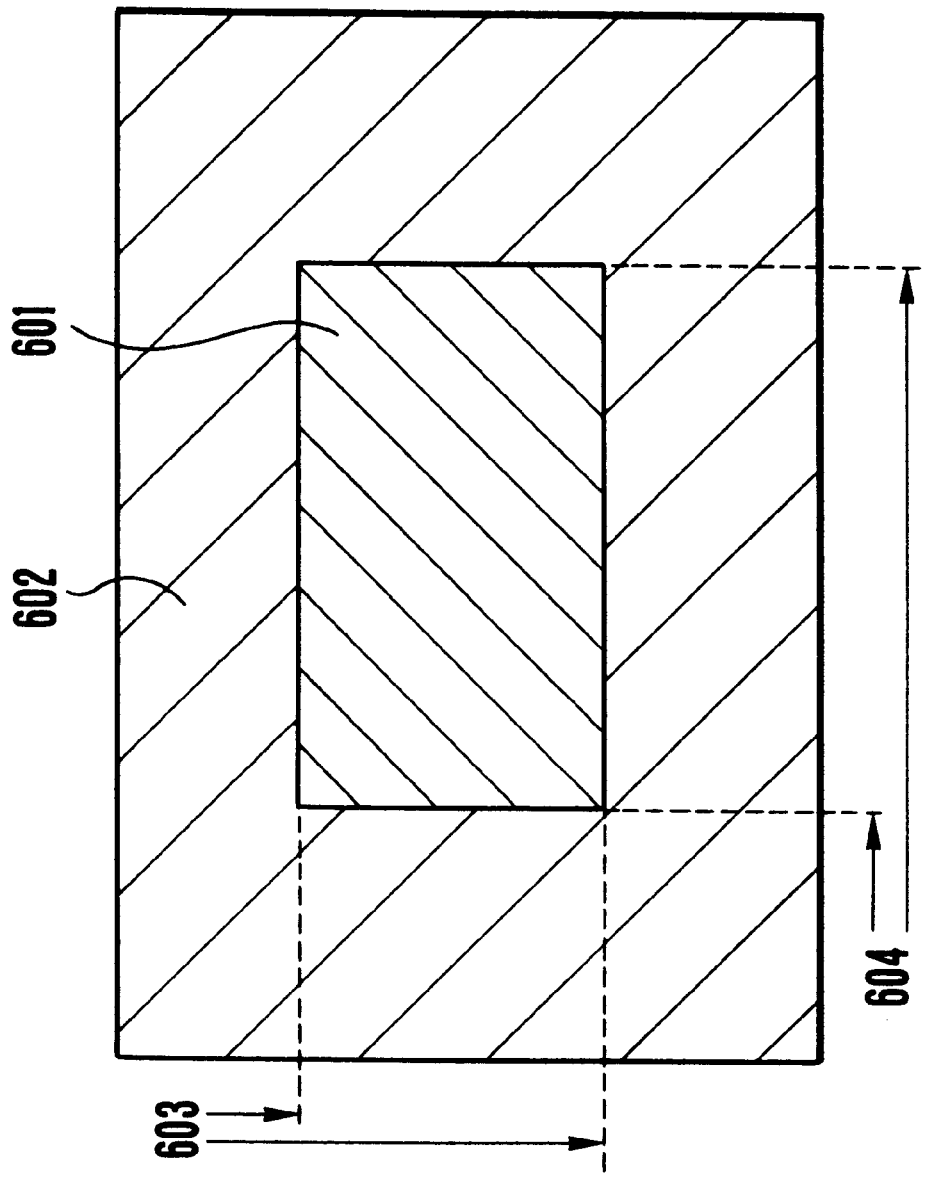
FIG. 19 is plan view showing by way of example the area divisions arranged on the image pickup plane of the eighth embodiment of the invention.
Figure 20:
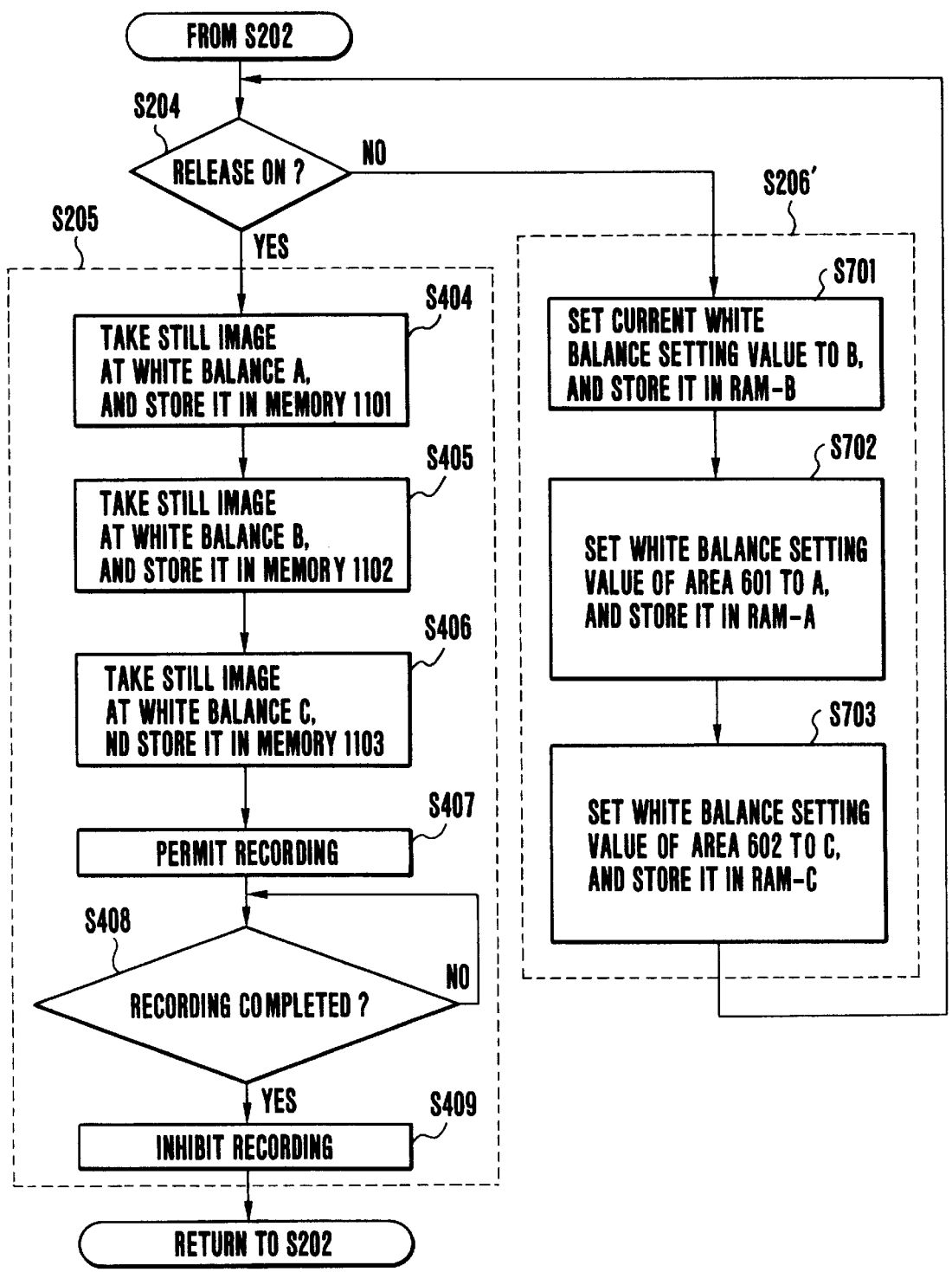
FIG. 20 is a flow chart showing in detail the procedures of the standby process and the still image shooting process of the eighth embodiment.

FIGS. 18, 19 and 20 show the arrangement of essential parts and the operating procedures of an eighth embodiment of this invention. The eighth embodiment is arranged to divide an image pickup plane into a plurality of areas; to set white balance individually for each of the divided areas; and to give still images which are obtained at different white balance setting values.

FIG. 18 is a block diagram showing processing parts of FIG. 14 related to white balance setting with signal systems 501 and 502 added to the processing parts. Referring to FIG. 18, for the purpose of dividing the area of the image pickup plane as mentioned above, a vertical sync signal (hereinafter referred to as VD signal) 501 and a horizontal sync signal (hereinafter referred to as HD signal) 502 are arranged to be sent from a microcomputer 119 to a signal processing circuit 233. These sync signals 501 and 502 are VD and HD signals which are controlled by the microcomputer 119. For example, from the sync signals 501 and 502, horizontal and vertical coordinates 604 and 603 are obtainable within the image plane as shown in FIG. 19. Therefore, an area 601 can be determined on each still image frame by the use of these sync signals 501 and 502. At the signal processing circuit 233, only a color signal located within the area 601 is extracted out of a color signal coming from a color sensor 232. This extracting process enables a white balance circuit 229 to set a white balance value, for example, only for the area 601 in which the object is located. Conversely, if a color signal of another area 602 which is located outside the area 601 is extracted, the white balance of the area 602 which, for example, corresponds to the background of the object can be likewise determined.

By using the signal processing circuit which is thus arranged to be capable of setting a white balance value individually for each of different areas, processes can be accomplished, for example, as shown in FIG. 20. The flow of procedures of these processes is as follows:

When the still image shooting mode is selected at the step S202 of FIG. 15, the flow comes to a step S204. At the step S204: Like in the case of the seventh embodiment, the flow waits until the release button 126 is pushed. During this waiting period, processes are executed, for example, as shown in FIG. 20. If the release button 126 is not pushed, the flow comes to a step S701. At the step S701: A white balance value is computed and set from the whole image plane currently obtained. This setting value is stored as a white balance value B in a RAM part RAM-B within the microcomputer 119. At a next step S702: A white balance value is set for the central area 601 of the image plane on the basis of the two sync signals VD 501 and HD 502. The white balance setting value is stored as a white balance value A in a RAM part RAM-A within the microcomputer 119. At a further step S703: A white balance value is set for the outer area 602. The value thus set is stored as a white balance value C in a RAM part RAM-C within the microcomputer 119. The flow waits until the release button 126 is pushed for a release while executing the processes of the steps S701 to S703 in the above-stated manner. Further, in a case where the release button 126 is pushed in the moving image shooting mode, the steps S701 to S703 must be executed at least once.

When the release for shooting is found to have been made at the step S204 with the release button 126 pushed, the flow comes to the step S205 for still image shooting. The step S205 consists of the processes of steps S404 to S409 like in the case of the seventh embodiment shown in FIG. 16. At the steps S404, S405 and S406: The white balance setting values are called out from the RAM of the microcomputer 119. Still image shots are taken with the white balance adjusted respectively to the white balance setting values A, B and C. Information on the still images thus obtained is stored respectively in the field memories 1101, 1102 and 1103. The flow then comes to the step S407 to permit recording on the magnetic tape 240. At the step S408: The flow waits for the completion of the recording. When the end of recording is informed, for example, from the microcomputer 119 of the recording system, the flow comes from the step S408 to the step S409. At the step S409: Recording on the tape 240 is inhibited until the writing into the memories comes to an end.

Recording the still image information from the field (image) memories 1101, 1102 and 1103 to the magnetic tape 240 is controlled, for example, by the microcomputer 119 of the recording system in accordance with the control procedures shown in FIG. 18 in the same manner as in the case of the seventh embodiment.

The eighth embodiment is thus arranged to give a plurality of still images by gradually changing the white balance according to the white balance values set individually for the divided areas of the image pickup plane. Therefore, a still image of a natural hue which is not affected by the color of the background or the like can be selected from among the plurality of still images. Further, the embodiment is also capable of giving a reproduced picture showing naturally reproduced colors over a wide range by combining a plurality of pictures through an image processing operation.

Embodiment 9

Figure 22:
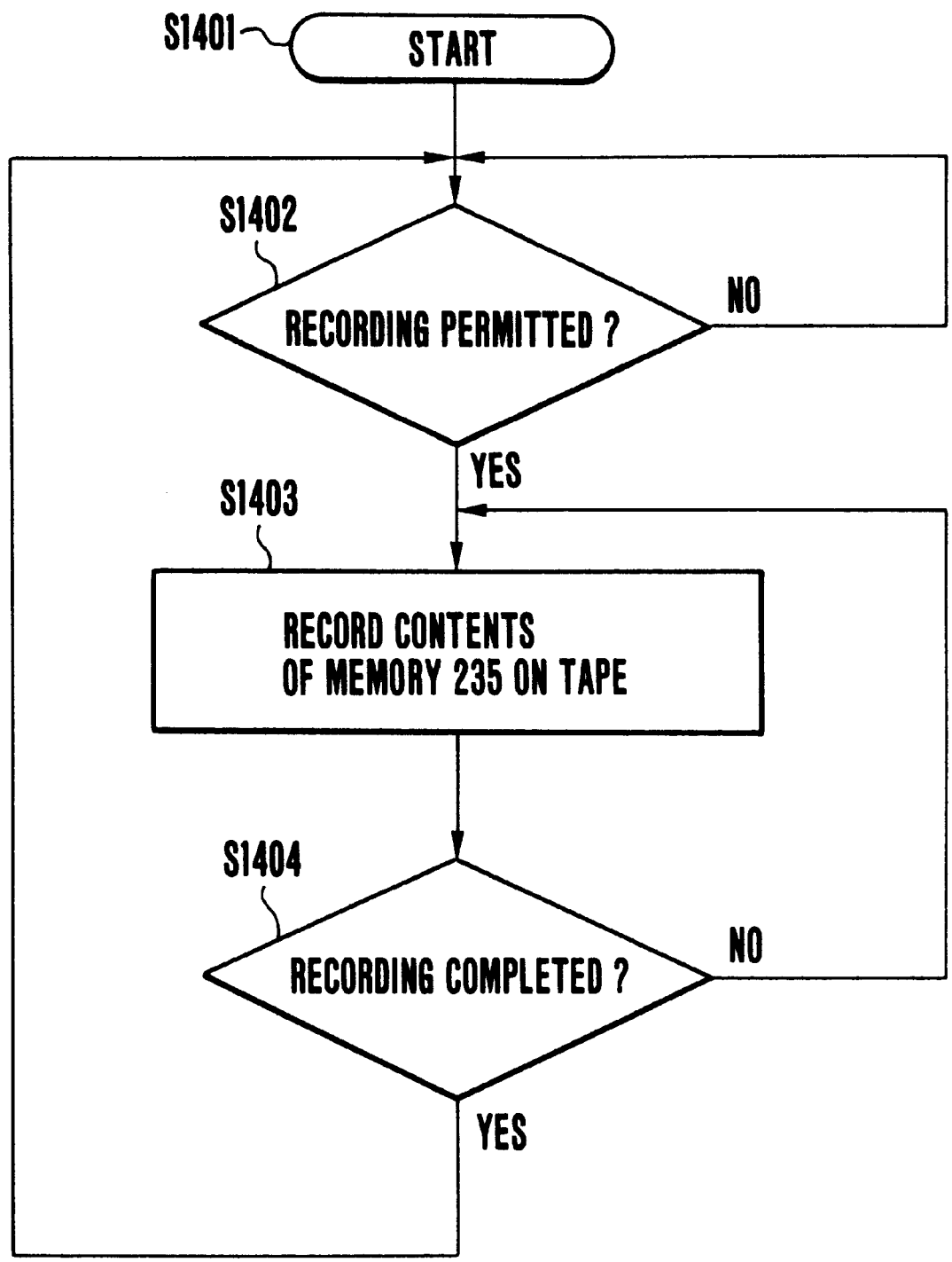
FIG. 22 is a flow chart showing the procedures for recording on a magnetic tape of the ninth embodiment.

FIGS. 21 and 22 show the operating procedures of a ninth embodiment of the invention. The ninth embodiment is arranged to be capable of setting white balance values individually for different areas like the eighth embodiment. In the case of the ninth embodiment, however, only one field memory is used.

Like in the case of the eighth embodiment, the white balance values for different areas such as the areas 601 and 602 of FIG. 19 are determined by the signal processing circuit system shown in FIG. 18. The flow of procedures of the ninth embodiment is as follows: Like the seventh and eighth embodiments, when the still image shooting mode is selected at the step S202, the flow comes to a step S204 to wait until the release button 126 is pushed. During this waiting period, processes are, for example, executed as shown at a step S206" in FIG. 21. The step S206" consists of steps S1001, S1002 and S1003. At the step S1001: A white balance value computed from the whole current image plane is set and this setting value is stored as a white balance value B in a RAM part RAM-2 within the microcomputer 119. At the next step S1002: Using the white balance value B as a reference value, the white balance for the central area 601 defined by the VD and HD sync signals 501 and 502 are set. The white balance setting value thus obtained is stored as a white balance value A in a RAM part RAM-1 within the microcomputer 119. At the step S1003: The white balance value for the outer area 602 is likewise set and the setting value thus obtained is stored as a white balance value C in a RAM part RAM-3 within the microcomputer 119. The flow waits until the release button 126 is pushed while executing the steps S1001, S1002 and S1003. Further, in a case where the release button 126 is pushed in the moving image shooting mode, the processes of the steps S1001 to S1003 must be executed at least once.

When a release is judged to have been made at the step S204 with the release button 126 pushed, the flow comes to a step S205' for still image shooting processes. The processes of the step S205' is divided into steps S1004 to S1011. At the step S1004: The count value of a counter n is set at "1". At the step S1005: The white balance setting value A, B or C is called out from the RAM part RAM-1, RAM-2 or RAM-3. (The setting value A is first called out). The white balance is adjusted to this value. At the step S1006: A still image shot is taken at this white balance value. Information on the still image is stored in an image memory 235. At the step S1007: The still image information thus stored is permitted to be recorded from the memory 235 onto the tape 240. At the step S1008: The flow waits for the completion of recording.

When the recording is judged to have been completed at the step S1008, the flow comes to the step S1009 to inhibit recording on the tape 240 until information on the next still image is stored in the memory 235. At the next step S1010: The count value of the counter n is incremented by one. At the step S1011: A check is made to find if the count value of the counter n is "4" (n=4). If not, the flow comes back to the step S1005 to set the white balance at the setting value stored in the next RAM. The flow then comes to again execute the processes of steps from the step S1006 through the step S1011. When the count value of the counter n reaches "4", the processes of the step S205' is terminated and the flow comes back to the step S202.

In this case, the procedures for recording on the magnetic tape 240 the still image information stored in the image memory 235 are as shown in FIG. 22. Referring to FIG. 22, the flow of the recording procedures begins at a step S1401. At a step S1402: A check is made to find if recording is permitted. If so, the flow comes to a step S1403. At the step S1403: The contents of the memory 235 are recorded on the tape 240. At a step S1404: A check is made to find if the recording is completed. If so, the flow comes back to the step S1402.

Unlike the seventh and eighth embodiments, the above-stated operation of the ninth embodiment obviates the necessity of use of a plurality of memories, although there arise some time differences depending on the still image to be recorded. The ninth embodiment thus permits a reduction in cost and also enables the photographer to select a still image which most beautifully represents the color of a desired object among the plurality of still images without being affected by other objects such as a background. It is also possible to obtain a reproduced picture showing a natural hue over a wide range by combining a plurality of pictures through some suitable image processing operation.

In accordance with the arrangement of each of the seventh to ninth embodiments of this invention, a camera of the kind arranged to be capable of taking shots of still images as well as moving images can be arranged to set a plurality of white balance values when a release button is pushed in the still image shooting mode; and to take a plurality of still image shots at these white balance setting values by changing them from one setting value over to another for every one of these still images. Therefore, even in the event of sudden changes in the state of the object or in the color temperature of a light source, a still picture which most accurately represents the color of the object can be selected later from among the plurality of still pictures obtained at the different white balance setting values. Further, with a plurality of still image shots taken by setting a plurality of white balance values individually for different areas of the image plane, inadequate hue adjustment due to any inadequate hue adjustment for a part of one image plane can be prevented. In addition to this advantage, a reproduced picture which beautifully represents the color of the object over a wide range can be obtained by combining a plurality of pictures through some suitable image processing operation. Further examples of embodiments of this invention are described as follows:

Embodiment 10

Figure 23:
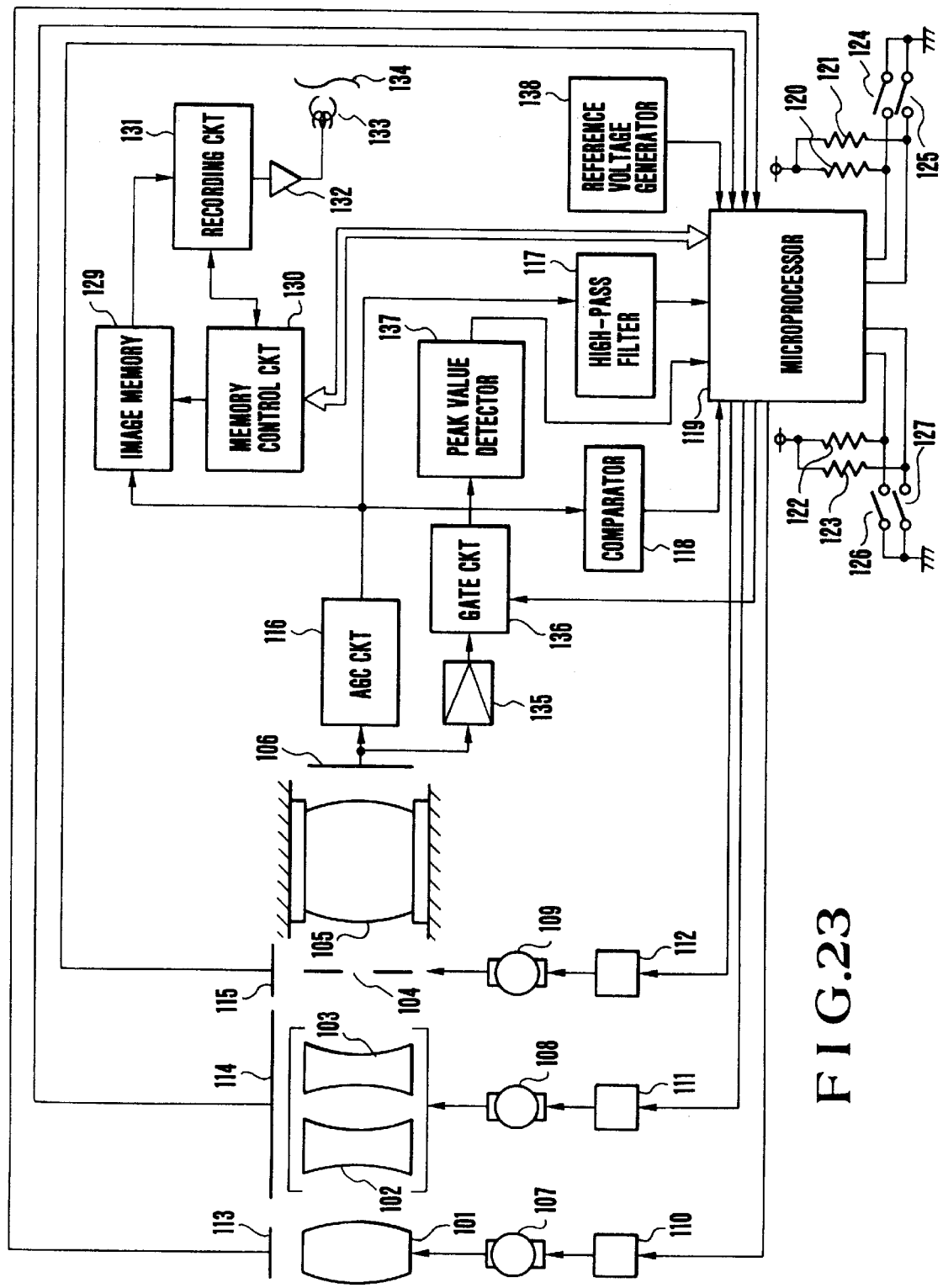
FIG. 23 is a block diagram showing the circuit arrangement of a tenth embodiment of the invention.

FIG. 23 is a block diagram showing a tenth embodiment of this invention. The illustration includes a first lens group 101 which is arranged to make focus adjustment; a variator lens 102; a compensator lens 103; a diaphragm 104; a fourth lens group 105 which is fixed; an image sensor 106; motors 107, 108 and 109 which are arranged to be used respectively for focus adjustment, magnifying power adjustment and aperture adjustment; drivers 110, 111 and 112 which are arranged respectively to drive the motors 107, 108 and 109; and encoders 113, 114 and 115 which are arranged to detect the lens positions and the aperture position of the diaphragm.

The illustration further includes an AGC (automatic gain control) circuit 116; a high-pass filter 117; a comparator 118 which is arranged to output a measured light value to be used for aperture adjustment; a microprocessor (or microcomputer) 119; pull-up resistors 120, 121, 122 and 123; a zoom telephoto switch 124; a zoom wide-angle switch 125; and a release button 126 which is arranged to make a release for still image shooting.

A mode selection switch 127 is arranged to select either a normal still image shooting mode or a bracketing still image shooting mode which is peculiar to this embodiment. The term "bracketing still image shooting mode" as used herein for the purpose of this invention means a mode in which a plurality of still image shots are taken by gradually varying and differentiating the photographing conditions of each shot from those of others in performing still image shooting.

The illustration further includes a still image memory 129; a memory control circuit 130; a recording circuit 131 which is arranged to convert still image information read out from the still image memory 129 into a video signal suited for recording; a recording amplifier 132; a magnetic head 133; a magnetic tape 134; an amplifier 135; a gate circuit 136 which is arranged to pass only the signals of such areas that considered to be necessary for light measurement (see FIG. 25); a peak value detector 137 and a reference voltage generator 138.

The arrangement of this embodiment as a whole is similar to the arrangement described in the foregoing with reference to FIG. 4.

Figure 24:
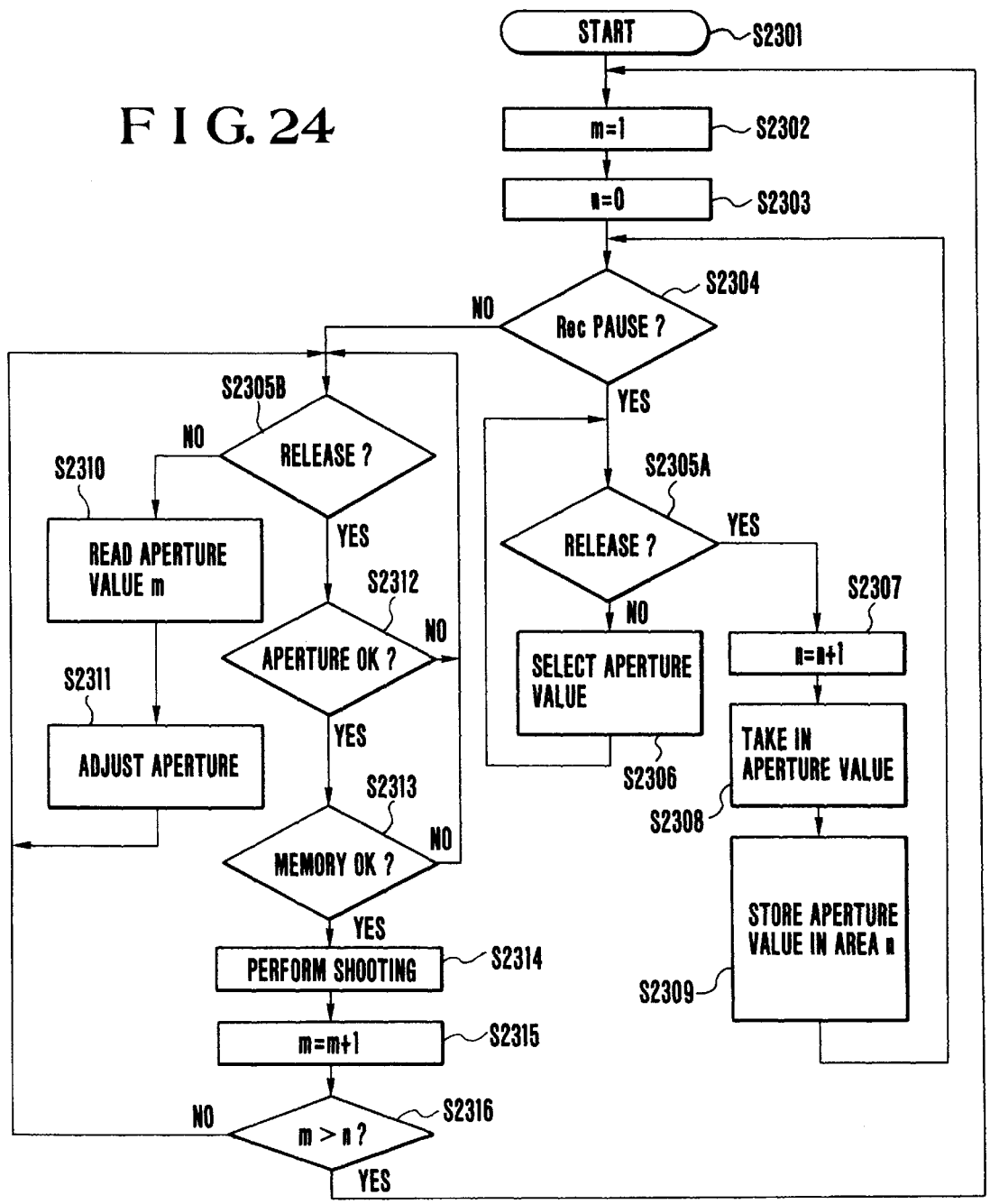
FIG. 24 is a flow chart showing the control procedures of the tenth embodiment of the invention.

FIG. 24 is a flow chart showing procedures for execution of the above-stated bracketing still image shooting mode. The recording processes on the magnetic tape in the bracketing still image shooting mode are executed in the same manner as described in the foregoing with reference to FIG. 6. Referring to FIG. 24, the flow of the bracketing still image shooting processes is executed by steps S2301 to S2316 as follows:

At the step S2301: The execution of the flow begins. At the steps S2302 and S2303: Counters m and n are reset respectively at "1" and "0". At the step S2304: A check is made for the state of a rec-pause (recording standby) function which is not shown. If it is judged to be in the rec-pause state, the flow comes to the step S2305A. At the step S2305A: A check is made to find if the release button 126 (for still image shooting) is pushed. If not, it is assumed that an aperture value is selected by the photographer, for example, by incrementing or decrementing, by one step, an aperture value determined by the camera or by setting it at a desired F-number (S2306). The flow then comes back to the step S2305A to continue the standby state. If the release button 126 is found to have been pushed, the flow comes to the step S2307. At the step S2307: The value of the counter n is incremented by one and the flow comes to the step S2308. At the step S2308: An aperture value is taken in. At the step S2309: This aperture value is stored in an applicable n-th storage area.

An n number of aperture values are stored in the above-stated manner. After that, when the rec-pause state is found to be canceled at the step S2304, the flow comes to the step S2305B. At the step S2305B: A check is made to find if the release button 126 is pushed. If not, the flow comes to the step S2310 to execute the steps S2310 and S2311 while the release button 126 is not pushed. At the step S2310: An m-th aperture value is read out in accordance with the sequence of aperture values stored at the step S2309. At the step S2311: The aperture of the diaphragm 104 is adjusted to this aperture value.

When it is confirmed at the step S2305B that the release button 126 is pushed, the flow comes to the step S2312. At the step S2312: A check is made to find if the aperture adjustment process has been completed at the step S2311. If not, the flow comes back to the step S2305B to inhibit the release for shooting. If the aperture is found at the step S2312 to have been completely adjusted, the flow comes to the step S2313 to check the output of the memory control circuit 130 and that of the recording circuit 131 to find if the image information stored in the image memory 129 has been completely recorded. If not, it is decided that the content of the memory 129 should be left unchanged and the flow comes back also to the step S2305B to inhibit the release.

When the writing of the image signal into the memory 129 is permitted at the step S2313 with the abovestated condition satisfied, the flow comes to the step S2314. At the step S2314: The output of the image memory 129 is recorded on the magnetic tape 134 through the recording circuit 131, the recording amplifier 132 and the magnetic head 133. After that, the flow comes to the step S2315 to increment the count value of the counter m by one.

At the step S2316: The count value of the counter m is checked to find if all the still images set have been completely recorded. If not, the flow comes back to the step S2304 to repeat the processes of steps from the step S2304. If so, the flow comes back to the step S2302 for a next round of shooting processes.

The upper limit of the value n depends on the program of the microprocessor. It is theoretically possible to store all the number of still images recordable on one magnetic tape. However, the storage capacity of the RAM and the number of possible combinations of aperture values in varying the aperture are limited. Therefore, the value n is determined on these conditions.

Embodiment 11

Figure 25:
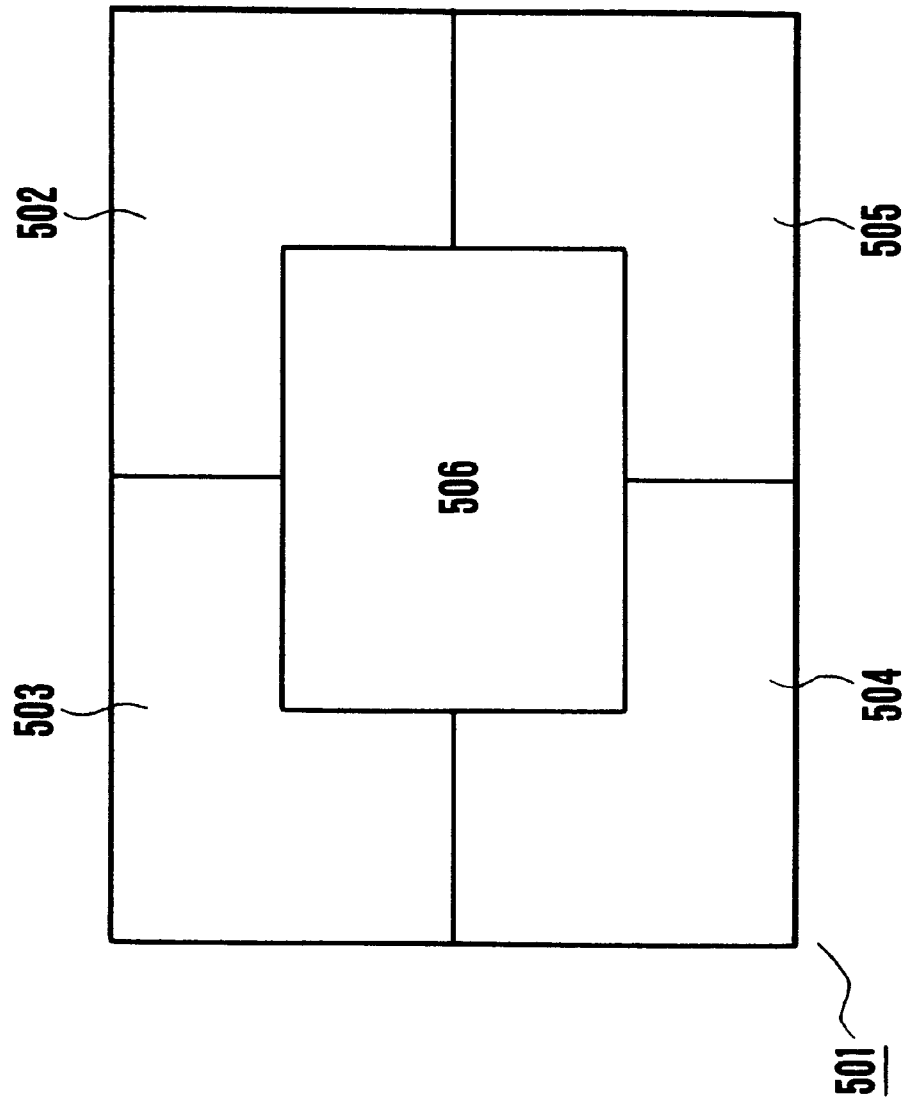
FIG. 25 shows light measuring areas.

FIG. 25 shows light measuring area dividing arrangement necessary for aperture control to be performed by an eleventh embodiment of this invention. In FIG. 25, a reference numeral 501 denotes the whole light measuring area, i.e., the whole area of a picture taking image plane. The whole image plane is divided into partial light measuring areas (hereinafter referred to as zones) 502, 503, 504, 505 and 506. When the whole area 501 is selected for light measurement, the light of the whole area is measured by an averaging light measurement mode. When the zone 506 is selected, only the light of the zone 506 is measured by the averaging light measurement mode. In other words, the averaging light measurement for each of the divided zones included in the whole area 501 can be considered to be the so-called partial light measurement for that zone.

Figure 26:
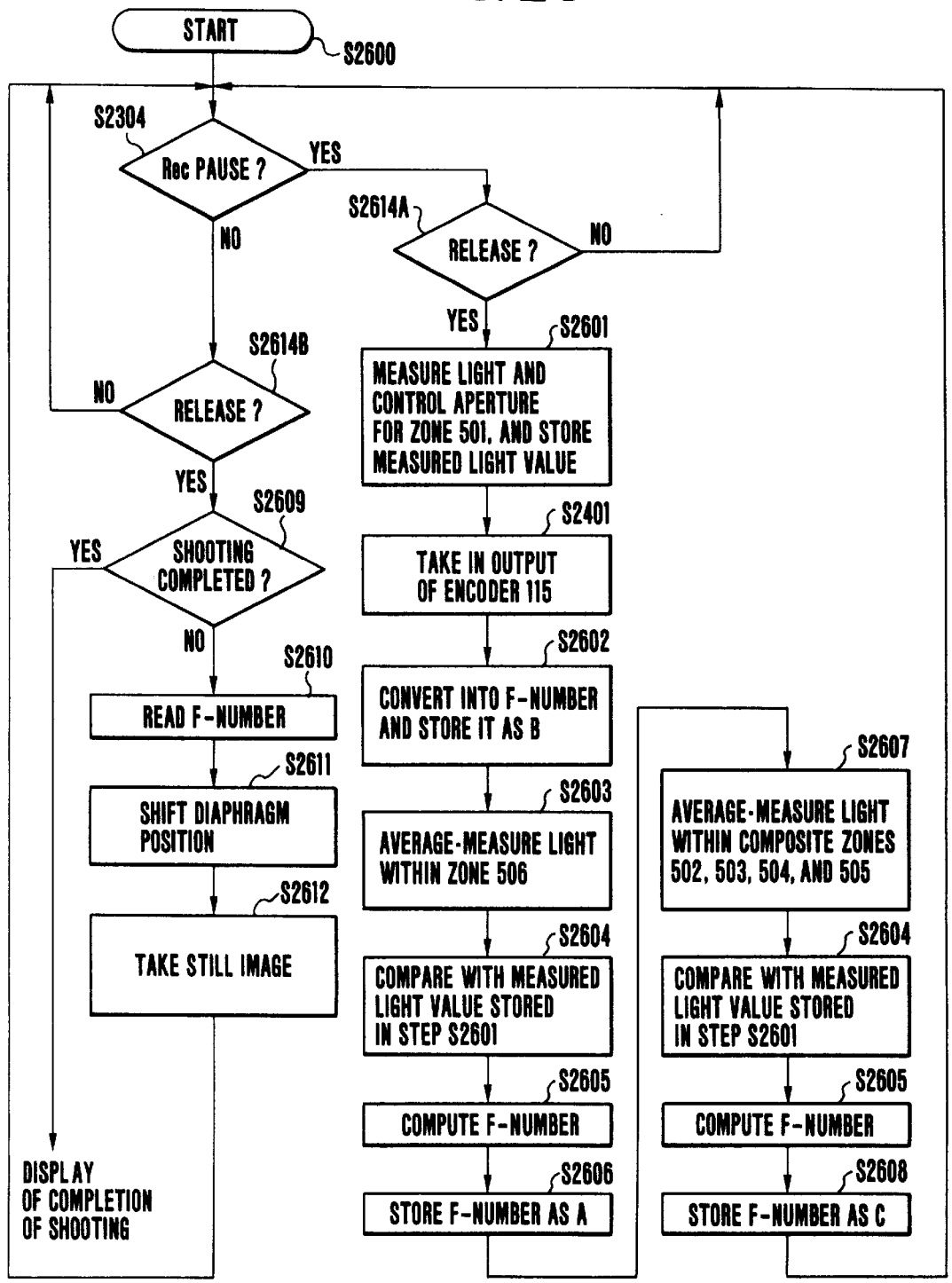
FIG. 26 is a flow chart showing by way of example the aperture value determining procedures of the invention.

FIG. 26 shows in a flow chart the processing procedures for taking still image shots by varying the light measuring area for each of the still image shots. Assuming that the mode selection switch 127 (see FIG. 4) is set on the side of the bracketing still image shooting mode, the flow of processes begins at a step S2600 of FIG. 26. The flow first comes to a step S2304. At the step S2304: A check is made for a rec-pause state. If the embodiment is found to be in the rec-pause state, the flow comes to a step S2614A. At the step S2614A: A check is made to find if the release button 126 is pushed. If not, the flow comes back to the step S2304.

If the release button 126 is judged to be in the pushed stated at the step S2614 after detection of the rec-pause state, the flow comes to a step S2601. At the step S2601: The light of the whole picture taking area, i.e., the area 501 is measured by the averaging light measurement mode. Then, a measured light value thus obtained is stored.

Further, at the step S2401, the current aperture position is taken in as the output value of the encoder 115. At a step S2602: The aperture position is converted into an F-number value. The F-number value is then stored as an aperture value B at an applicable memory address. At a step S2603: The light of the zone 506 (partial area) is measured by the averaging light measurement method (partial light measurement). At a step S2604: A measured light value thus obtained is compared with the measured light value stored at the step S2601. At a step S2605: The result of comparison is converted into an aperture value. At a step S2606: This aperture value is stored at an applicable memory address as an aperture value A, or an F-number A, obtained as a result of the partial light measurement result A for the zone 506. At a step S2607: The light of composite zones 502, 503, 504 and 505 is measured by the averaging light measurement method. At a step S2604: A measured light value thus obtained is compared with the measured light value stored at the step S2601. At a step S2605: The result of comparison is converted into an aperture value. At a step S2608: This aperture value is stored at an applicable memory address as a partial light measurement result C for the composite zones. The method for converting the measured light value into an F-number is as follows:

Referring again to FIG. 24, the level of the output of the image sensor 106 is proportional to the quantity of light if no correction is applied to the output of the image sensor 106 or if the output is not saturated. Therefore, the output of the image sensor 106 is amplified by the amplifier 135 and then the signal of the light measuring area is alone allowed to pass by the gate circuit 136. The peak value of the signal passed is detected by the peak value detector 137 and supplied to the microprocessor 119.

Generally, the aperture value (F-number) which is necessary for obtaining a preset adequate image level is obtainable by the following formula (1):

$$\text{(adequate F-number)} = \text{(current F-number)} \times (\text{``current image level''} / \text{``adequate image level''})^{1/2} \quad (1)$$

An adequate F-number, therefore, can be obtained if the microprocessor 119 is capable of interchanging the signal output of the encoder 115 with an F-number and grasping the image level of each of the light measuring zones. In this embodiment, the microprocessor 119 is thus arranged to be capable of determining F-numbers A and C at steps S2606 and S2608.

Again referring to FIG. 26, with the F-numbers A, B and C determined in the above-stated manner, the flow comes back to the step S2304 to wait for cancellation of the rec-pause. When recording begins with the state of the rec-pause canceled, the flow comes to a step S2614B. At the step S2614B: A check is made to find if the release button 126 is pushed. If so, the flow comes to a step S2609: At the step S2609: A check is made for confirmation of the fact that all the shots have been taken at the preset F-numbers. In the initial round of the flow, the result of check is of course negative. The flow therefore proceeds to a step S2610. At the step S2610: The value A is called out as a shooting F-number. At a next step S2611: The aperture position of the diaphragm 104 is shifted until the output value of the encoder 115 comes to show this F-number. Upon completion of the shift, the flow comes to a step S2612 to take a still image shot. The flow then comes back to the step S2304.

After that, if the shooting operation is found at the step S2609 to be not completed as yet, the flow comes again to the step S2610. This time, the aperture value B is called at the step S2610 and the above-stated processes are repeated. When the shooting operation is judged at the step S2609 to have been finished, the flow is terminated, for example, by displaying the end of the shooting operation.

With the embodiment arranged to perform the processes as described above, various light measuring methods can be selected including a background weighting method as well as a center weighting method and a whole image-plane averaging method, so that a plurality of still image shots can be taken respectively at aperture values suited to these light measuring methods.

Embodiment 12

Figure 27:
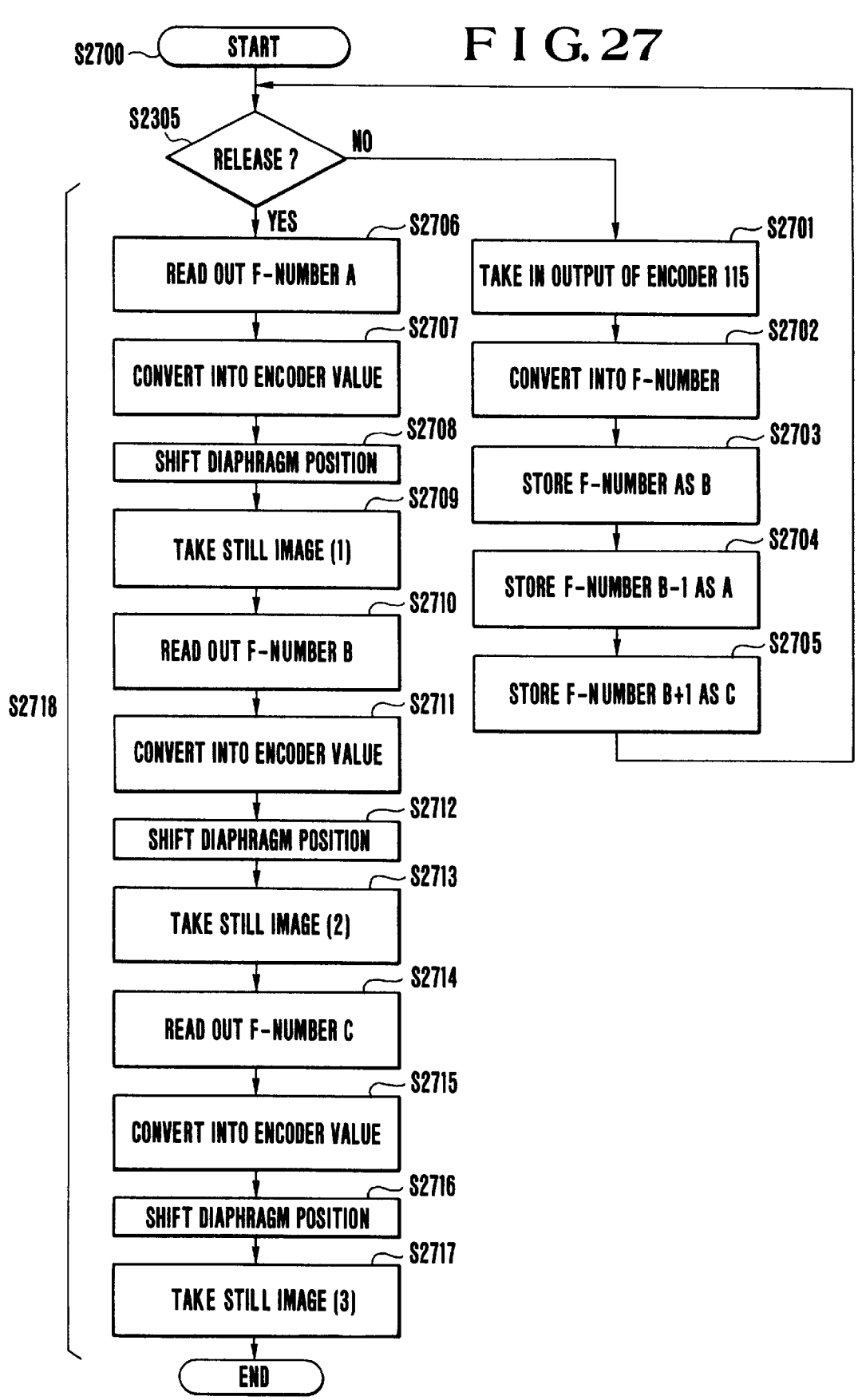
FIG. 27 is a flow chart showing the control procedures of an eleventh embodiment of the invention.

FIG. 27 shows in a flow chart a twelfth embodiment of this invention. The twelfth embodiment is provided with a plurality of image memories and is arranged to rapidly store a plurality of still images serially in these image memories one after another when a release button is pushed once. The arrangement of the embodiment around these image memories is similar to what is described in the foregoing with reference to FIG. 12.

The control procedures of the twelfth embodiment are as described below with reference to FIG. 27:

At a step S2701: The output of the aperture value encoder 115 is taken in. At a step S2702: The microprocessor 119 converts the encoder output into an F-number value. At a step S2703: The F-number value is stored as an F-number B. At steps S2704 and S2705: Amounts of exposure or F-number values A and C are computed respectively by increasing and decreasing the F-number value B by one step. The computed values A and C are also stored. The flow of control procedures waits until the release button 126 is pushed while executing the processes of the steps S2701 to S2705 in the manner as described above. Further, even in a case where the release button 126 is pushed in the moving image shooting mode, the processes of the steps from S2701 through S2705 must be executed at least once.

When a release for shooting is judged to have been made at the step S2305 with the release button 126 pushed, the flow comes to a step S2718, which consists of a series of processes of steps from S2706 through S2712.

At the step S2706 included in the step S2718: The F-number A which is stored at the step S2704 is read out. At the step S2707: The F-number A is converted into a value corresponding to the output value of the encoder 115. At the step S208: The aperture position of the diaphragm 104 is shifted until the aperture reaches the value obtained by the step S2707. Upon completion of the shift, the flow comes to the step S2709. At the step S2709: A shot of a still image (1) is taken at the aperture value (or F-number) A. At the steps S2710, S2711, S2712 and S2713: Processes are likewise executed to take a shot of a still image (2) at the F-number B. At the steps S2714, S2715, S2716 and S2717: Processes are also executed to take a shot of another still image (3) at the F-number C.

As mentioned in the foregoing description of the prior art, the still image is recorded in the PCM area or the like on the magnetic tape at the same head/tape relative speed as in the case of moving image shooting. If the still image is to be recorded in the recording area which corresponds to, for example, a wrap angle range of 30 degrees around the rotary head cylinder, the recording requires several to scores of recording tracks, which corresponds to a recording time of several to scores of vertical sync periods. This recording time is too long to secure a shutter opportunity. To solve this problem, a plurality of memories are arranged, for example, as in the case of the memories 1101, 1102 and 1103 of FIG. 13. These memories are provided in such a number that is required for the bracketing still image shooting or in a minimum necessary number for taking shots without widening the bracketing intervals of the still image shots. Such arrangement enables the apparatus to carry out a shooting operation without missing any shutter opportunities.

Assuming that two bracketing intervals are necessary for recording in the PCM area 1104 a still image stored in the memory 1101, other still images are arranged to be stored respectively in other memories 1102 and 1103 during the process of recording in the PCM area. This arrangement enables the apparatus to store a fourth still image in the memory 1101 upon completion of the process of recording in the PCM area 1104. With three memories thus arranged to be used in rotation, the bracketing still image shooting can be consecutively performed as many times as desired.

With the embodiment arranged in the above-stated manner, shots can be taken not only at an aperture which is determined to be appropriate by the camera but also at other apertures obtained by opening and stopping down the aperture by one step. Therefore, even in a case where there are a plurality of objects having different amounts of brightness within one and the same image plane, the possibility of having a photographic failure due to the so-called black-out or wash-out can be minimized.

Further, it is possible to obtain a still picture having a wide dynamic range of contrast by inputting reproduced images again to the plurality of image memories and by combining these images through a digital process.

In an image recording apparatus which is of the kind arranged to be capable of recording still images as well as moving images and arranged as the tenth or eleventh embodiment of the invention as described above, a plurality of still image shots can be taken by gradually varying the aperture according either to the liking of the photographer or to the whole or partial brightness of the object. The apparatus is capable of giving images of objects located within one and the same image plane without showing any black-out or wash-out part in each of the image. After shooting, a still image shot which is most adequately taken among others can be selected. It is also possible to eventually broaden the dynamic range relative to the quantity of light by combining these still images.

In accordance with the above-stated arrangement of the twelfth embodiment described above, a plurality of still images can be recorded by changing the light measuring method employed for one of the still images to a different light measuring method for another. The arrangement enables the embodiment to give an image of each object without any so-called black-out or wash-out part while retaining the promptness of recording (or shooting). After, shooting, a still image shot which is most adequate among others can be selected. It is also possible to eventually broaden the dynamic range relative to the quantity of light by combining these still images.

Further, in performing the bracketing still image shooting (by changing the exposure condition of each still image shot from that of another shot) by using only one field (or frame) image memory for taking in the still images, the content of the memory cannot be renewed during the process of recording a preceding still image on the tape. In that case, the release for shooting is inhibited. A reliable apparatus, therefore, can be arranged at a low cost in accordance with the invention.

In the case of the twelfth embodiment, the aperture value is changed by changing the light measuring method. However, it will be apparent to those skilled in the art that still image shots can be also continuously taken by changing any factors that are alterable according to the light measuring method, such as the accumulation time of the image sensor, etc. Further, in the case of this embodiment, it is assumed that a plurality of still images are continuously recordable in response to one performance of the release operation. However, in a case where the recording time and the still-image-taking-in timing must be taken into consideration, it is necessary to take some appropriate measures, such as increasing the number of image memories or controlling the timing of recording. However, description of such measures is omitted herein as it deviates from the subject-matter of this invention.

Embodiment 13

Figure 28:
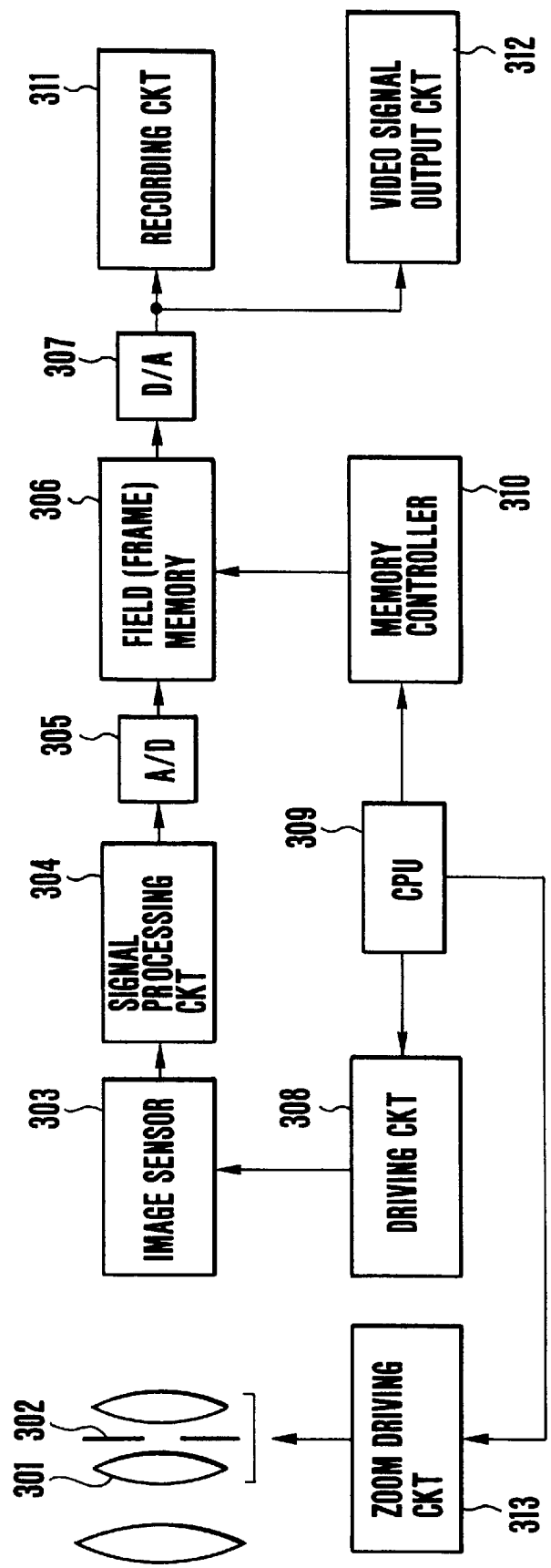
FIG. 28 is a block diagram showing in outline a thirteenth embodiment of the invention.

FIG. 28 shows in a block diagram a thirteenth embodiment of this invention. The illustration includes a zoom lens 301; a diaphragm 302; an image sensor 303; a signal processing circuit 304; an A/D converter 305; a field (or frame) memory 306; a D/A converter 307; a driving circuit 308 for driving the image sensor 303; a CPU (central processing unit) 309 which controls the whole apparatus; a memory controller 310 which controls writing and reading actions on the field (or frame) memory 306; a recording circuit 311 which records the output of the D/A converter 307; a video signal output circuit 312; and a zoom driving circuit 313 which drives the zoom lens 301.

Figure 29:
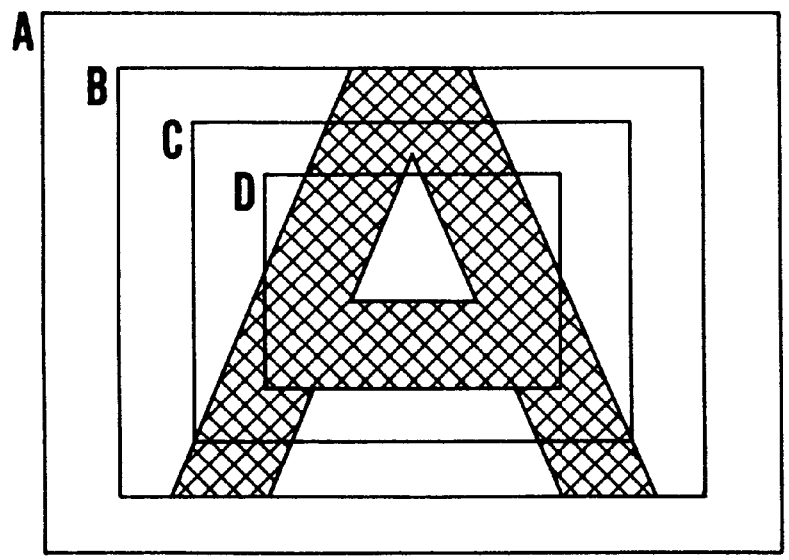
FIG. 29 shows angles of view taken in shooting.

The operation of the thirteenth embodiment is described as follows: The CPU 309 sends a control signal to the zoom lens driving circuit 313 to have the zoom lens 301 set at a first focal length position. An angle of view which is obtained then is assumed to be A as shown in FIG. 29. Next, the CPU 309 causes the diaphragm 302 to be set at an aperture determined by light measuring means which is not shown. A signal which is formed at the image sensor 303 by photo-electric conversion is sent via the signal processing circuit 304 to the A/D converter 305 to be A/D (analog-to-digital) converted into a digital video (image) signal there. At the same time, the CPU 309 sends a memory multi-writing control signal to render the memory controller 310 into a multi-writing mode. Then, the A/D converted signal is reduced to a suitable size and is stored in the field (or frame) memory 306.

Upon completion of the process of storing in the memory 306, the CPU 309 causes the zoom lens 301 to be set at a second focal length position. An angle of view obtained at the second focal length is assumed to be B. A shot is taken at the angle of view B in the same manner as in the case of the angle of view A is likewise stored in the field (or frame) memory 306. For other angles of view C and D, shots are taken and the image (or video) signals thus obtained are likewise stored.

Figure 30:
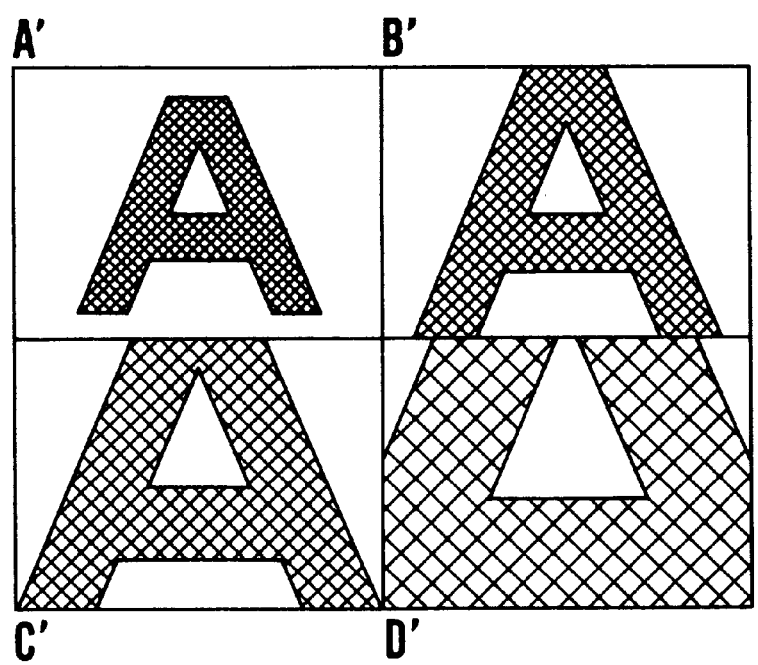
FIG. 30 shows images on a multi-image display.

Upon completion of shot-taking and storing actions for all the variously set focal lengths, the CPU 309 sets the memory controller 310 into a reading mode. The memory controller 310 is thus caused to output a memory reading signal. A plurality of images which are stored as a multiple image plane in the field (or frame) memory 306 in the above-stated manner are read out from the memory. The images thus read out is supplied via the D/A converter 307 to the video signal output circuit 312. Then, a multi-image display is made in a state as shown in FIG. 30 on a monitor which is not shown.

One of the images on the multi-image display is selected through an operation button which is not shown. The CPU 309 recognizes the angle of view corresponding to the image selected and then causes the zoom lens 301 to be shifted to the position of this angle of view. After that, a shooting action is performed in response to a depressing operation on a release button which is not shown. The image selected is recorded on a recording medium (not shown) through the recording circuit 311.

Embodiment 14

Figure 31:
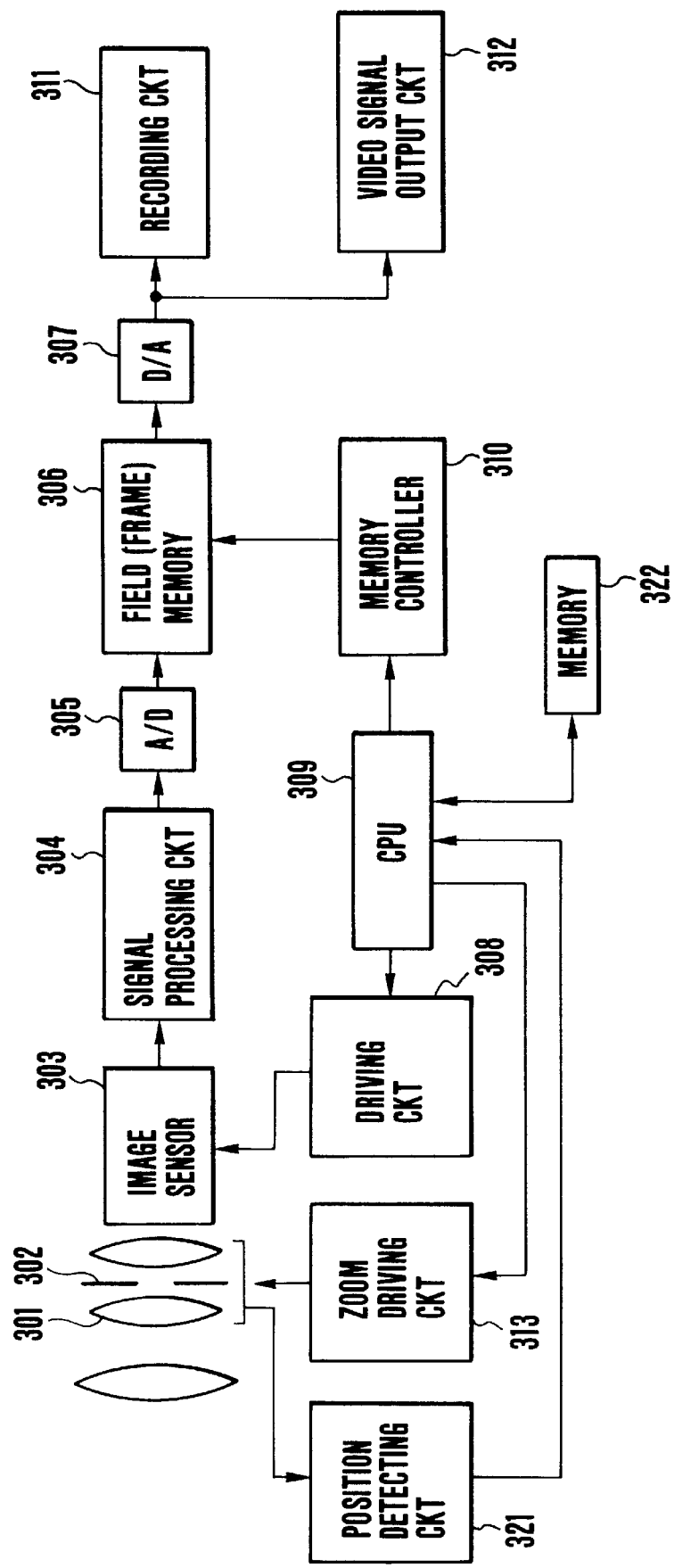
FIG. 31 is a block diagram showing in outline a fourteenth embodiment of the invention.

FIG. 31 shows in a block diagram a fourteenth embodiment of the invention. In FIG. 31, all blocks that have the same functions as those of FIG. 28 are indicated by the same reference numerals and the details of them are omitted from the following description.

Referring to FIG. 31, a zoom position detecting circuit 321 is arranged to detect the position of the zoom lens 301. A memory 322 is arranged to store information on the position in which the zoom lens 301 is set.

In the thirteenth embodiment, the angle of view used for taking a shot is determined by the CPU 309. Whereas, in the case of the fourteenth embodiment, the zoom lens 301 is arranged to be manually operated by the photographer. An image is stored in the field (or frame) memory 306 when the release button (not shown) is pushed. At the same time, information on the zoom lens position detected by the zoom position detecting circuit 321 is stored in the other memory 322.

Upon completion of taking shots at a plurality of angles of view, a multi-image display is made in the same manner as in the case of the thirteenth embodiment on a monitor which is not shown. Then, also in the same manner as the thirteenth embodiment, a shot is taken at the selected angle of view and the image thus obtained is recorded on a recording medium which is not shown.

The thirteenth and fourteenth embodiments are arranged, as described above, to temporarily write into an image memory a plurality of images taken at different angles of view; to permit the photographer to select one image having an angle of view best desired among the plurality of images on a multi-image display; after the selection, to shift again the position of the zoom lens to a position corresponding to the desired angle of view; to take a shot at that angle of view selected; and to record the image thus obtained on the recording medium. This arrangement not only enables the photographer to do trimming work at a higher speed but also greatly saves the electric energy required.

What is claimed is:

1. An image pickup device comprising:

(a) image sensing means having an optical system for converting image pickup light coming from an object to be photographed into an electrical signal;

(b) still trigger means for producing a still picture recording trigger signal;

(c) recording means for recording the electrical signal obtained from said image sensing means; and (d) control means for recording a predetermined number of still image signals whose image pickup conditions are different each other by a predetermined difference in response to said still picture recording trigger signal.

2. A device according to claim 1, wherein said optical system includes means for focusing said image pickup light.

3. A device according to claim 1, wherein said optical system includes an iris.

4. A device according to claim 1, wherein said image sensing means includes a CCD.

5. A device according to claim 1, wherein said optical system includes means for zooming.

6. A device according to claim 1, wherein said image pickup conditions include focus conditions.

7. A device according to claim 1, wherein said image pickup conditions include white balance conditions.

8. A device according to claim 1, wherein said image pickup conditions include iris conditions.

9. A device according to claim 1, wherein said image pickup conditions include zooming conditions.

10. A device according to claim 1, wherein said image pickup conditions include exposure conditions.

11. An image pickup apparatus comprising:

(a) image sensing means having an optical system for converting image pickup light coming from an object to be photographed into an electrical signal, said image sensing means being arranged to variably set an image sensing condition;

(b) trigger means for triggering an image sensing operation of said image sensing means; and (c) control means for recording a predetermined number of still image signals whose image pickup conditions are different each other by a predetermined difference in response to a still picture recording trigger signal produced by said trigger means.

12. An apparatus according to claim 11, wherein said image sensing means includes an image sensing element for photoelectrically converting the image pickup light and an optical means disposed at the front of said image sensing element to guide said image pickup light to said image sensing element.

13. An apparatus according to claim 12, wherein said image sensing element includes a CCD.

14. A device according to claim 12, wherein said optical system includes means for focusing said image pickup light.

15. A device according to claim 12, wherein said optical system includes an iris.

16. A device according to claim 12, wherein said optical system includes a zoom lens.

* * * * *

UNITED STATES PATENT AND TRADEMARK OFFICE
CERTIFICATE OF CORRECTION

PATENT NO. : 6,028,981
DATED : February 22, 2000
INVENTOR(S) : Masahide Hirasawa, et al.

It is certified that error appears in the above-identified patent and that said Letters Patent are hereby corrected as shown below:

Col. 3, line 30, delete "head" and insert -- heat --.
Col. 9, line 15, delete "aperture,.etc.," and insert -- aperture, etc., --.

Signed and Sealed this

Seventeenth Day of April, 2001

Attest:

NICHOLAS P. GODICI

*Attesting Officer*  *Acting Director of the United States Patent and Trademark Office*